United States Patent [19]
Gallant et al.

[11] Patent Number: 5,815,810
[45] Date of Patent: Sep. 29, 1998

[54] METHOD AND APPARATUS FOR IMPROVED CALL CONNECTIVITY IN AN INTELLIGENT WIRELESS NETWORK

[75] Inventors: John Gallant; Steven R. Donovan, both of Plano; Anousheh Raissyan, Dallas; Jeremy Chiou, Plano, all of Tex.

[73] Assignee: MCI Commnications Corporation, Washington, D.C.

[21] Appl. No.: 910,148

[22] Filed: Aug. 13, 1997

Related U.S. Application Data

[63] Continuation of Ser. No. 495,997, Jun. 28, 1995, abandoned.

[51] Int. Cl.$^6$ .................................................... H04Q 7/38
[52] U.S. Cl. ............................................................ 455/433
[58] Field of Search ..................................... 455/433, 411

[56] References Cited

U.S. PATENT DOCUMENTS

| | | |
|---|---|---|
| 4,979,207 | 12/1990 | Baum et al. . |
| 5,027,388 | 6/1991 | Bradshaw et al. . |
| 5,222,125 | 6/1993 | Creswell et al. . |
| 5,233,642 | 8/1993 | Renton . |
| 5,251,248 | 10/1993 | Tokunaga et al. . |
| 5,285,494 | 2/1994 | Sprecher et al. . |
| 5,297,189 | 3/1994 | Chabernaud . |
| 5,301,223 | 4/1994 | Amadon et al. . |
| 5,345,498 | 9/1994 | Mauger . |
| 5,353,331 | 10/1994 | Emery et al. . |
| 5,428,665 | 6/1995 | Lantto ........................................ 379/58 |
| 5,467,381 | 11/1995 | Peltonen et al. ........................... 379/58 |
| 5,504,804 | 4/1996 | Widmark et al. ...................... 379/59 X |
| 5,523,997 | 6/1996 | Bishop, Jr. ............................. 379/60 X |
| 5,561,840 | 10/1996 | Alvesalo et al. ......................... 455/33.1 |
| 5,564,068 | 10/1996 | Nguyen .................................. 455/33.1 |
| 5,577,264 | 11/1996 | Tuohino ................................. 455/33.2 |
| 5,579,372 | 11/1996 | Astrom ..................................... 379/58 |
| 5,581,596 | 12/1996 | Hogan ....................................... 379/59 |
| 5,583,916 | 12/1996 | Maenpaa ................................... 379/58 |
| 5,588,039 | 12/1996 | Ohkubo et al. ............................ 379/58 |
| 5,590,175 | 12/1996 | Gallant et al. ............................ 379/58 |
| 5,590,398 | 12/1996 | Matthews ............................... 455/33.1 |
| 5,596,624 | 1/1997 | Armbruster et al. ...................... 379/58 |
| 5,600,708 | 2/1997 | Mech et al. ............................... 379/59 |
| 5,603,095 | 2/1997 | Uola ....................................... 455/67.1 |

OTHER PUBLICATIONS

Yafie, "Nextel Lauches In Chicago" Wireless Week Sep. 23, 1996.

Menezes, "US West Building Wireless Business" Wireless Week Nov. 25, 1996.

*Primary Examiner*—William Cumming

[57] ABSTRACT

The method and apparatus for completing calls to mobile stations in a mobile radio communications network provides efficient routing of calls, reduced utilization of system resources, and consistent services to a mobile station wherever located. The invention includes a national home location register (HLR) with a wireless enhanced services platform (WESP) with integrated voice mail/audio response capability. Calls to and from mobile subscribers are delivered to the WESP. The WESP interacts with the national HLR to provide consistent mobile services as well as enhanced services such as information collection and validation prior to call completion. When a call to a mobile station is placed, the call is directed to the WESP which transmits the identity of the mobile station to the national HLR. The national HLR looks up the mobile station and obtains the identity of the serving mobile switching center/visitor location register (MSC/VLR) where the mobile station is actually located and a list of the features in effect for the mobile station. The list of features in effect is transmitted to the WESP which performs the functions necessary to implement the features. These functions include validation in conjunction with the national HLR if any features in effect require validation. The national HLR also sends a request for routing information to the serving MSC/VLR. The serving MSC/VLR returns a geographic routing number known as the temporary local directory number (TLDN). The call is then completed to the serving MSC/IVLR.

66 Claims, 22 Drawing Sheets

FIG. 5c

| 550 Data Record |||
|---|---|---|
| 590 Suscriber ID | 592 Serving MSC/VLR Indicator | 594 Features in Effect |

FIG. 5d

| 594 Features in Effect |||
|---|---|---|
| 594-1 Call Forwarding | 594-2 Billing Features | 594-3 FAX Features |
| 594-4 Enh. Call Forwarding | 594-5 Call Screening | 594-6 Additional Features |

METHOD AND APPARATUS FOR IMPROVED CALL CONNECTIVITY IN AN INTELLIGENT WIRELESS NETWORK

This application is a Continuation of U.S. patent application Ser. No. 08/495,997, filed Jun. 28, 1995 abandoned.

BACKGROUND OF THE INVENTION

1. Field Of The Invention

The invention relates to cellular telephone systems, and in particular, to a method and apparatus for improving call connectivity in an intelligent wireless network.

2. Background Information

The current cellular network was designed around a regional deployment architecture. This design causes inefficiency in call completion scenarios involving long distance calls to roaming mobile subscribers or long distance call forwarding.

One problem arises when a long distance call to a cellular telephone must be forwarded. This occurs when the subscriber has activated call forwarding and the cellular telephone is busy or the subscriber does not answer. The subscriber may not answer the telephone for several reasons. The telephone may be turned off, it may be in a location where there is no cellular coverage, or the subscriber may simply choose not to answer the telephone when it rings. When a long distance call is placed to a cellular telephone, a connection is established from the originating telephone to the home area switch of the cellular telephone. This connection is maintained while the home area switch attempts to establish a connection to the destination cellular telephone. If the call cannot be completed and forwarding is active, the home area switch establishes a second connection from itself to the switch serving the telephone to which the call is being forwarded. Two long distance connections are established for one telephone call and both connections are maintained for the entirety of the call.

Another problem arises when a long distance call to a roaming cellular telephone is completed. In the current art, a call is connected from the originating telephone to the home area switch of the destination cellular telephone. The home area switch then establishes another connection from itself to the switch for the area where the destination cellular phone is located. Two long distance connections are established for one telephone call and both connections must be maintained for the entirety of the call.

Another problem which arises is that national mobile service is inconsistent. Currently, there are different providers in different regions which use multiple vendors to provide cellular service. Since vendors have different sets of capabilities, even with roaming agreements in place, when subscribers move from one service provider region to another, they will experience inconsistent service. This may result in some services being unavailable in some areas or in some services operating differently from area to area. Thus, a subscriber who is roaming will find that the particular services to which he subscribes function differently depending upon his location.

The existence of the current multi-vendor, multi-provider system also causes the nationwide introduction of new services and features to take a longer time than is desirable. Each cellular service provider has control over which services it offers and when the services are introduced. No new service can be considered nationwide in scope until all service providers offer that service. Due to the number of service providers, it is likely that it would take quite a while for any particular service to be offered nationwide.

In addition, different regional networks support different wireless technologies such as analog cellular, personal communications service, etc. This makes roaming and service interaction even more difficult.

SUMMARY OF THE INVENTION

An object of this invention is to reduce the system resources used in handling calls to cellular telephones which are not completed.

Another object is to route long distance calls to roaming cellular telephones in a more efficient manner.

Another object is to provide consistent services to a cellular telephone subscriber no matter where located.

Another object is to reduce the time it takes to introduce new cellular telephone features on a nationwide basis in a multi-provider environment.

Another object is to provide seamless support for multiple wireless technologies.

These and other objects and advantages are achieved by the method and apparatus for completing calls to mobile stations in a mobile radio communications network. The invention includes a national home location register (HLR) platform in conjunction with a wireless enhanced services platform (WESP) integrated with voice mail/audio response capability. The invention is used by national mobile service providers and resellers to provide consistent national service with improved network efficiency. This is accomplished by keeping the call control at the WESP and storing all subscriber information in the national HLR. Calls to and from mobile subscribers are delivered to the WESP. The WESP interacts with the national HLR to provide consistent mobile services as well as enhanced services such as information collection and validation prior to call completion. This is accomplished through interaction of the WESP with the national HLR and the capability of the WESP to collect and validate information when instructed. The WESP also has the capability of creating billing records which can be used to accommodate flexible billing options such as Caller Paid, Subscriber Paid with Personal Identification Number (PIN), Subscriber Paid, etc.

The WESP includes a host controller and a switching matrix which routes calls in response to commands from the host controller. The WESP also includes voice mail/audio response capability which allows it to collect and validate information. The national HLR includes information about each mobile station possessed by a subscriber to enhanced wireless service.

The WESP may be deployed in a centralized or localized configuration. In the centralized configuration, the WESP interfaces with mobile switching centers and end-office switches through long distance switches. In the localized configuration, the WESP interfaces directly with mobile switching centers and end-office switches. This allows local traffic to remain local without involving a long distance switch. The WESP provides the same functionality and services in either configuration. In this document, the term wireless enhanced services platform (WESP) used without reference to the specific configuration, refers to either configuration.

Subscribers to cellular service implemented by the centralized configuration receive a non-geographic alias telephone number or subscriber ID for their cellular station. A caller enters the alias telephone number and the telecommunications network uses the alias number to direct the call to the WESP. Subscribers to cellular service implemented by the localized configuration use the usual local geographic wireless numbers. Calls placed to these numbers are routed directly to the WESP, an alias number is not required to route wireless terminating calls to the WESP in the localized configuration.

The method starts with a call to a mobile station being accepted at a network switch. If the call includes an alias telephone number, the call is directed to a long distance switch. If the call includes a local geographic telephone number, the call is directed to an end-office switch. In either case, the call is directed to the WESP which transmits the telephone number to the national HLR. The national HLR looks up the telephone number and obtains an indicator of the serving mobile switching center/visitor location register (MSC/VLR) where the mobile station is actually located and a list of the features in effect for the mobile station. The list of features in effect is transmitted to the WESP which performs the functions necessary to implement the features. These functions include prompting, information collection and validation in conjunction with the national HLR if any features in effect require validation. The national HLR also sends a request for routing information to the serving MSC/VLR. The serving MSC/VLR returns a geographic routing number known as the temporary local directory number (TLDN). The call is then completed to the serving MSC/VLR.

DESCRIPTION OF THE DRAWINGS

FIG. 5c is a format of a data record 550 stored on national HLR 183.

FIG. 5d is a format of Features in Effect field 594.

FIG. 9 is a diagram of the implementation of new services on a nationwide basis using the example service call screening, in accordance with the centralized embodiment of the invention.

FIG. 10 is a representation of the routing which occurs when the destination station does not answer or is busy and call forwarding is active, in accordance with the centralized embodiment of the invention.

DETAILED DESCRIPTION OF THE INVENTION

Figure 1:
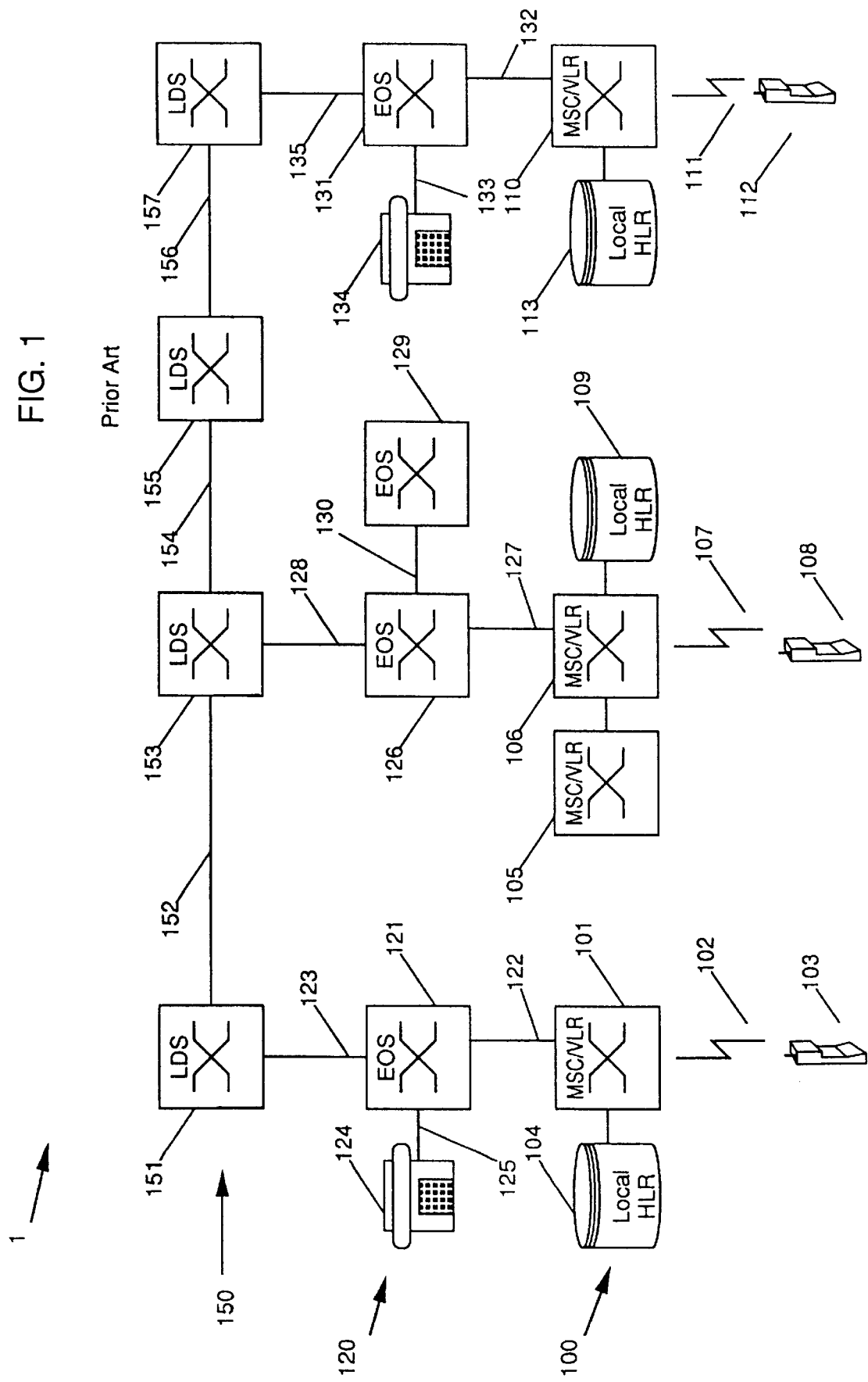
FIG. 1 is a block diagram of the architecture of a prior art nationwide cellular telephone network.

In FIG. 1, there are three tiers 100, 120 and 150 which comprise the current nationwide cellular telephone network 1. The first tier 100 is made up of all the local cellular carrier systems. This includes mobile switching centers with visitor location registers (MSC/VLR) 101, 105, 106 and 110, operated by local cellular service providers. Each MSC/VLR includes two parts. The mobile switching center (MSC) is a switch which routes calls to or from subscriber stations (cellular telephones) and performs call handling functions as well as mobility management functions. The visitor location register (VLR) is a database storing information about each subscriber station visiting or roaming within the MSC service area. This information allows the MSC to process incoming and outgoing calls for each such station. Each MSC/VLR communicates with the subscriber stations 103, 108 and 112 within each MSC/VLR service area over radio links 102, 107 and 111 respectively. Each MSC/VLR provides switching facilities for several cells, allowing subscriber mobility between cells. Some MSC/VLRs are connected to other MSC/VLRs, such as MSC/VLR 105 which is connected to MSC/VLR 106. This connection allows calls to be routed directly between MSC/VLRs. However, not all MSC/VLRs are interconnected to each other and calls must be routed over other portions of the telecommunications network to the destination MSC/VLRs. Each MSC/VLR or group of MSC/VLRs also includes a home location register (HLR) 104, 109 or 113. The HLR contains information about each subscriber station whose home area is assigned to the MSC/VLRs associated with the HLR. This information allows incoming calls to subscriber stations to be correctly routed to each such station.

The second tier 120 is made up of local switches operated by local exchange carriers (LEC). These include end-office switches (EOS) 121, 126 and 131, operated by local exchange carrier companies. Also included, but not shown, are access tandems (AT) which provide long distance carriers with access to more than one EOS within a given local access and transport area (LATA). Each EOS connects to land-line telephones such as 124 and 134 over land-based wiring 125 and 133. An EOS may connect to one or more MSC/VLRs over land based wiring 122, 127 and 132. An EOS may also be directly connected to another EOS, such as EOS 126 connected over wiring 130 to EOS 129. EOSs may also be coupled to each other through ATs, but this is not shown. Each EOS provides switching facilities to route calls between local telephones, local MSC/VLRs and the long distance network 150.

The third tier 150 is the long distance network which includes long distance switches (LDS) 151, 153, 155 and 157. Each LDS is connected to at least one other LDS. Here, LDS 151 is shown coupled to LDS 157 by way of two intermediate LDSs 153 and 155. This is only an example. In reality, the number of intermediate LDSs between two LDSs may vary consideraly. Here, LDS 151 is shown connected to LDS 153 by way of trunk 152. LDS 153 is connected to LDS 155 by trunk 154 and LDS 155 is connected to LDS 157 by trunk 156. In addition, an LDS may be connected to one or more EOSs, such as LDS 151 connected to EOS 121 by trunk 123 and to EOS 126 by trunk 128 and LDS 157 connected to EOS 131 by trunk 133. An LDS may also be coupled to EOSs through one or more ATs, but this is not shown. Calls are routed between EOSs over various LDSs, ATs and long distance trunks.

Figure 2:
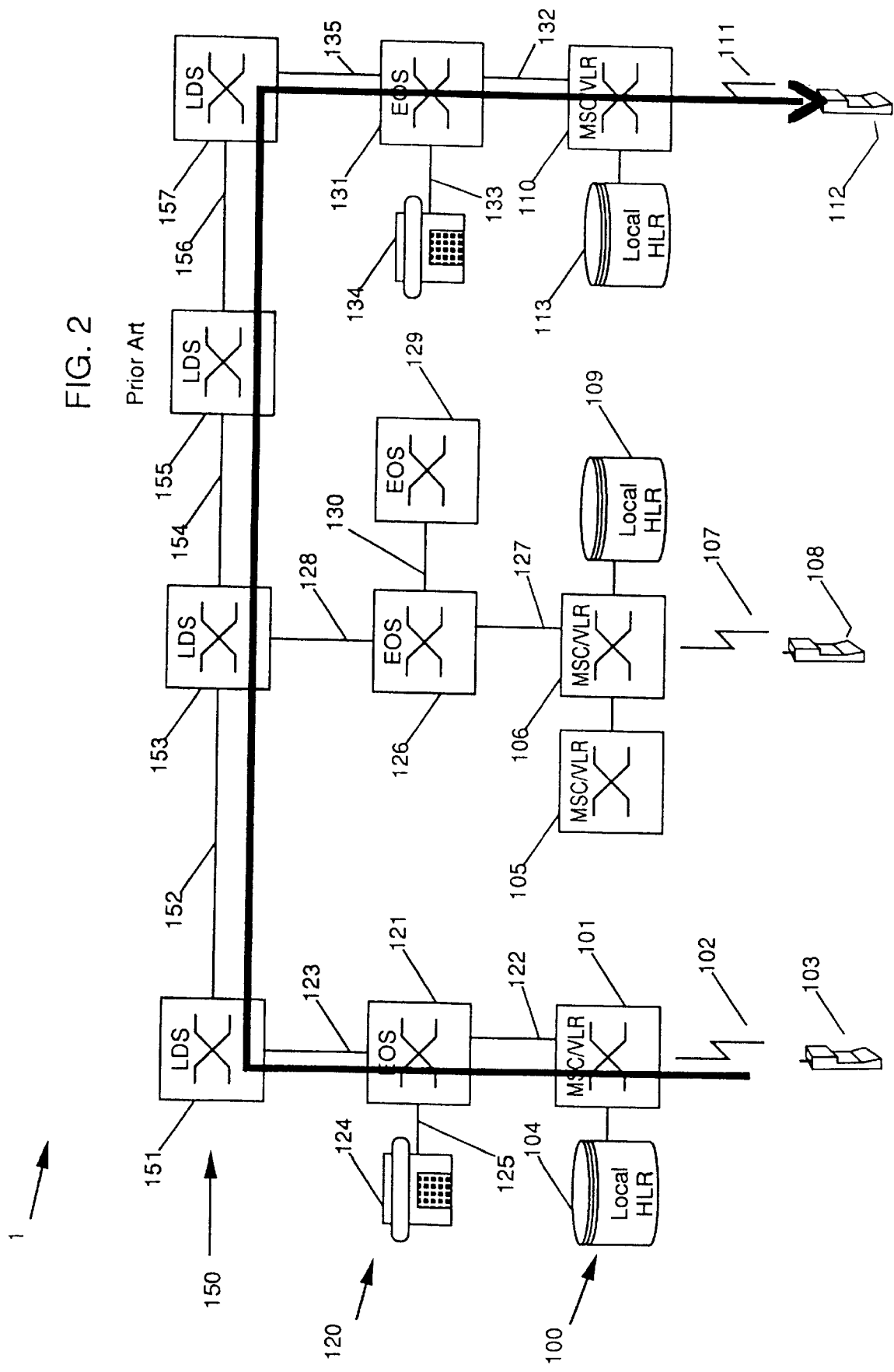
FIG. 2 is an example of the routing of a normally completed call in the prior art nationwide cellular telephone network of FIG. 1.

FIG. 2 is an example of the routing of a normally completed call in the current cellular network 1. A subscriber station has a telephone number which geographically identifies the MSC/VLR which controls the station's home area. The appropriate MSC/VLR is identified by the combination of the area code and prefix of the telephone number. When a call is placed from subscriber station 103 to station 112 or alternatively from land-line telephone 124 to station 112, EOS 121 determines from the area code and prefix of the dialed number that the call is to be routed to MSC/VLR 110. The call is routed as follows: from station 103 to MSC/VLR 101 to EOS 121 or alternatively from land-line telephone 124 to EOS 121, to LDS 151, to LDS 157 by way of intermediate LDSs 153 and 155, to EOS 131, to MSC/VLR 110. When the call arrives at MSC/VLR 110, the MSC/VLR 110 accesses HLR 113, obtains the information necessary to route the call to station 112 and completes the call.

Figure 3A:
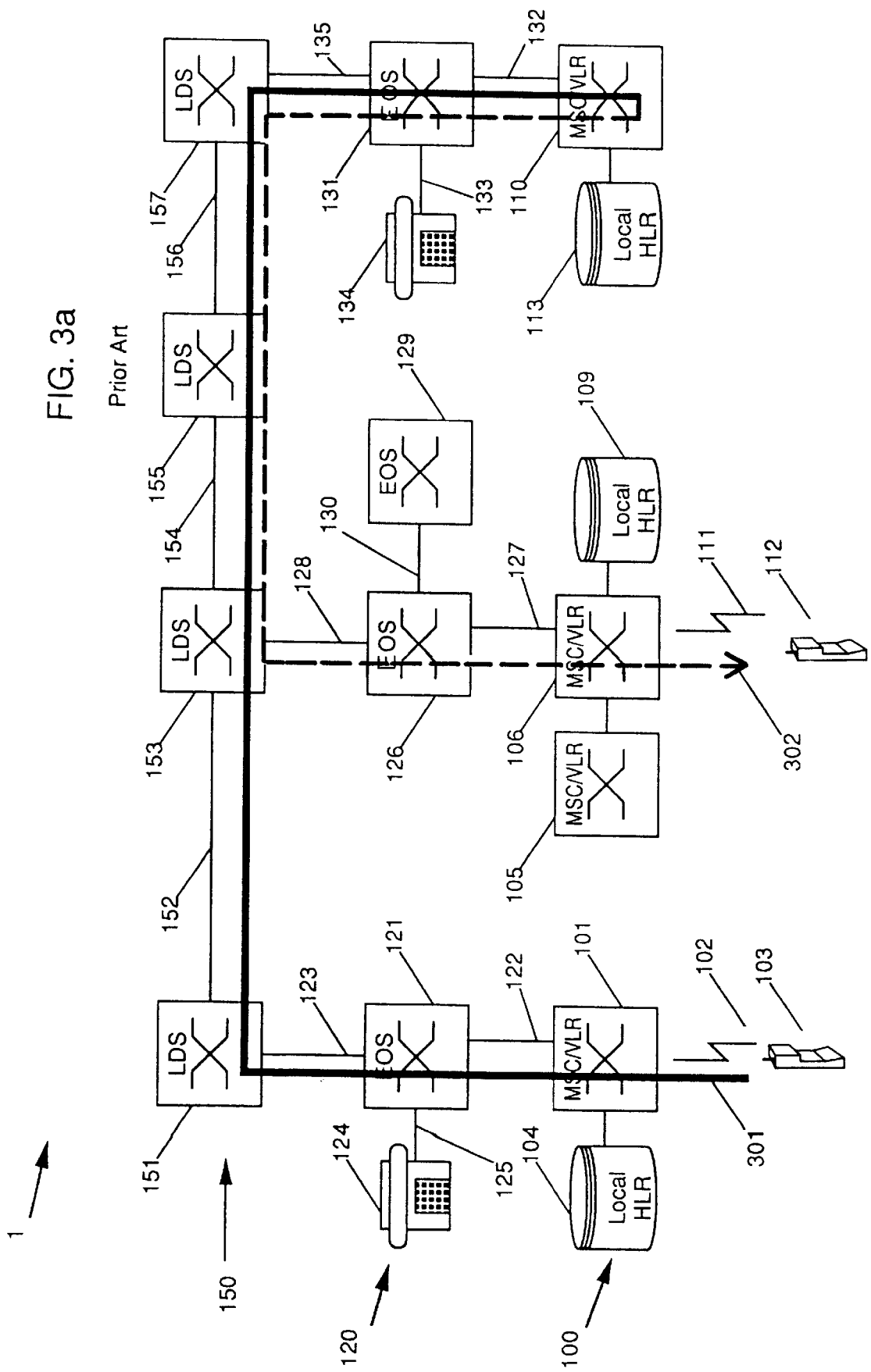
FIG. 3a is an example of a call completed to a subscriber station that has roamed outside its home area in the prior art nationwide cellular telephone network of FIG. 1.

FIG. 3a is an example of a call completed to a subscriber station that has roamed outside its home area in the current cellular network 1. Subscriber station 112 has roamed away from its home area at MSC/VLR 110 to the area of MSC/VLR 106. When a call is placed from subscriber station 103 to station 112 or alternatively from land-line telephone 124 to station 112, the EOS again determines that the call is to be routed to MSC/VLR 110. The call is routed along path 301 as follows: from station 103 to MSC/VLR 101 to EOS 121 or alternatively from land-line telephone 124 to EOS 121, to LDS 151, to LDS 157 by way of intermediate LDSs 153 and 155, to EOS 131, to MSC/VLR 110. When the call arrives at MSC/VLR 110, the MSC/VLR 110 accesses HLR 113 to obtain the information necessary to route the call to station 112. However, in this case, the information from HLR 113 indicates that station 112 is roaming in the service area of MSC/VLR 106. HLR 113 then obtains a geographical routing number from MSC/VLR 106 and returns this number to MSC/VLR 110. MSC/VLR 110 then routes the call on a separate circuit along path 302 back to EOS 131, to LDS 157, to LDS 151 to LDS 153, to EOS 130 to MSC/VLR 106. MSC/VLR 106 accesses its visitor location register 114, obtains the information necessary to complete the call to station 112 over radio link 111 and completes the call. This routing makes inefficient use of network resources because two separate long distance circuits are tied up on one call.

Figure 3B:
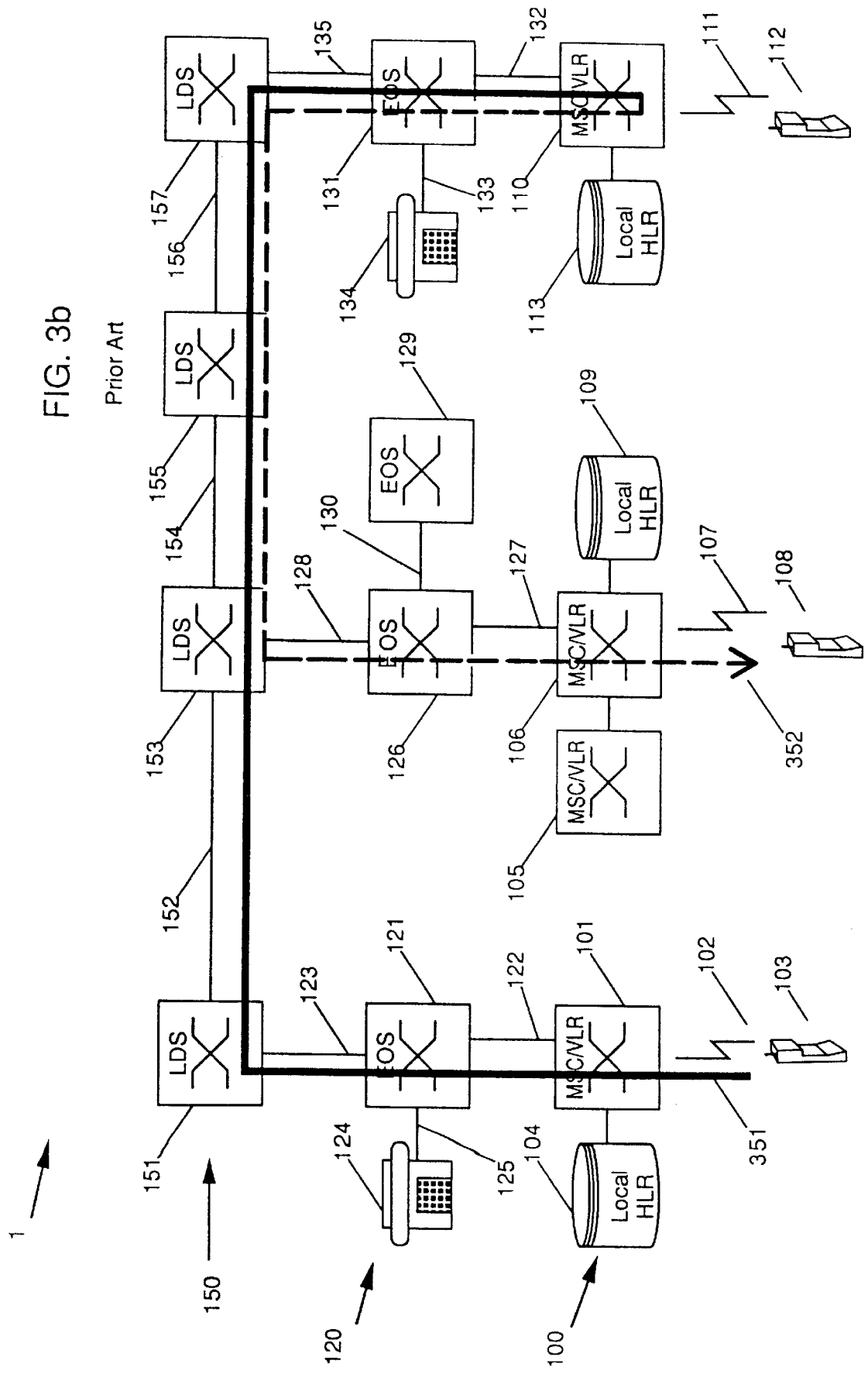
FIG. 3b is an example of a call placed to a subscriber station which has been forwarded to another station in the prior art nationwide cellular telephone network of FIG. 1.

FIG. 3b is an example of a call placed to a subscriber station which has been forwarded to another station in the current cellular network of FIG. 1. When a call is placed from subscriber station 103 to station 112 or alternatively from land-line telephone 124 to station 112, the EOS again determines that the call is to be routed to MSC/VLR 110. The call is routed along path 301 as follows: from station 103 to MSC/VLR 101 to EOS 121 or alternatively from land-line telephone 124 to EOS 121, to LDS 151, to LDS 157 by way of intermediate LDSs 153 and 155, to EOS 131, to MSC/VLR 110. When the call arrives at MSC/VLR 110, the MSC/VLR 110 attempts to establish connection 111 with station 112. Because station 112 is busy or does not answer and station 112 has call forwarding active, VLR/MSC 110 determines that the call forwarding procedure is to be invoked for this station. MSC/VLR 110 accesses HLR 113 to determine the number to which station 112 has been forwarded. In this example, the directory number of station 108 would be returned to MSC/VLR 110. MSC/VLR 110 then routes the call on a separate circuit along path 302 back to EOS 131, to LDS 157, to LDS 151 to LDS 153, to EOS 130, to MSC/VLR 106, to station 108 over radio link 107. This routing makes inefficient use of network resources because two separate long distance circuits are tied up on one call.

Figure 4A:
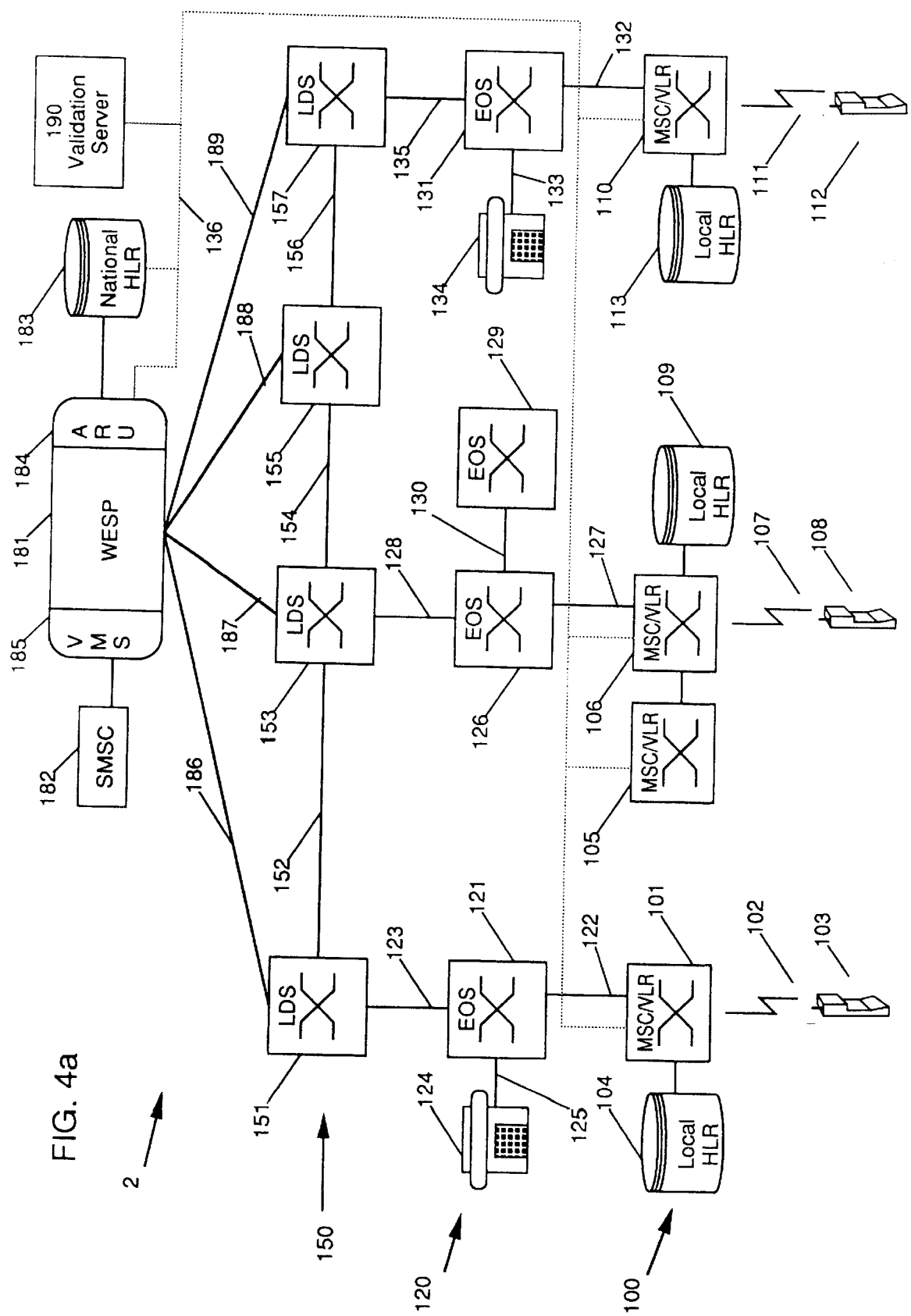
FIG. 4a is a block diagram of a nationwide cellular network incorporating the centralized embodiment of the invention.

The WESP may be deployed in a centralized or local configuration. FIG. 4a is a block diagram of the nationwide cellular network 2 in accordance with the centralized embodiment of the invention. The invention includes a wireless enhanced services platform (WESP) 181 which includes voice mail server (VMS) 185, audio response units (ARU) 184, short message service center (SMSC) 182 and national HLR 183. WESP 181 is coupled to LDSs 151, 153, 155 and 157 through telecommunications network lines 186, 187, 188 and 189. These lines are shown as an example. Not all LDSs must be connected to WESP 181. Lines 186, 187, 188 and 189 transmit audio as well as signaling information. WESP 181 and HLR 183 are connected by SS7 network 136 to each MSC/VLR, here shown as MSC/VLRs 101, 106 and 110. Also shown is validation server 190 which may be coupled to SS7 network 136 to off load some validation processing from national HLR 183. Although only one validation server is shown, it is well known in the art to connect more than one server to a network to distribute work load.

Figure 4B:
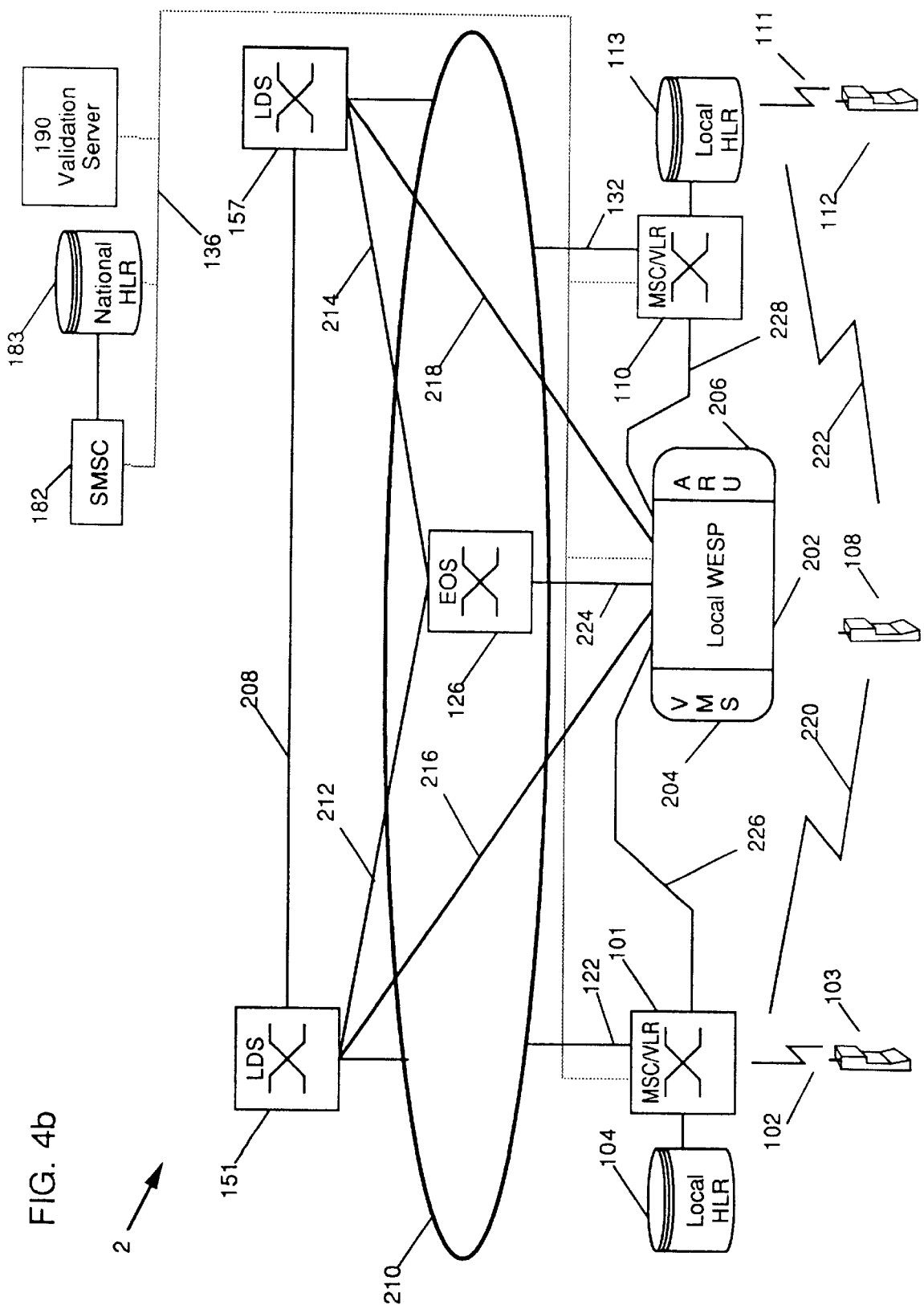
FIG. 4b is a block diagram of a nationwide cellular network incorporating the localized embodiment of the invention.

FIG. 4b is a block diagram of the nationwide cellular network 2 in accordance with the localized embodiment of the invention. For clarity, much of the illustration of the nationwide network has been removed from the figure and is now represented by network 210. The invention includes a local wireless enhanced services platform (L-WESP) 202 which includes voice mail server (VMS) 204 and audio response units (ARU) 206. A centralized short message service center (SMSC) 182 and national HLR 183 are also included in this embodiment. L-WESP 202 is coupled to MSC/VLRs 101 and 110 through telecommunications network lines 226 and 228 respectively, to LDSs 151 and 157 through telecommunications network lines 216 and 218 respectively and to EOS 126 through telecommunications line 224. In addition, EOS 126 is connected to LDSs 151 and 157 through trunks 212 and 214. These lines are shown as an example. Not all LDSs, EOSs or MSC/VLRs must be directly connected to L-WESP 202. Lines 216, 218, 224, 226 and 228 transmit audio as well as signaling information. L-WESP 202 and HLR 183 are connected by SS7 network 136 to each other and to each MSC/VLR, here shown as MSC/VLRs 101 and 110. Also shown is validation server 190 which may be coupled to SS7 network 136 to off load some validation processing from national HLR 183. Although only one validation server is shown, it is well known in the art to connect more than one server to a network to distribute work load.

Figure 5A:
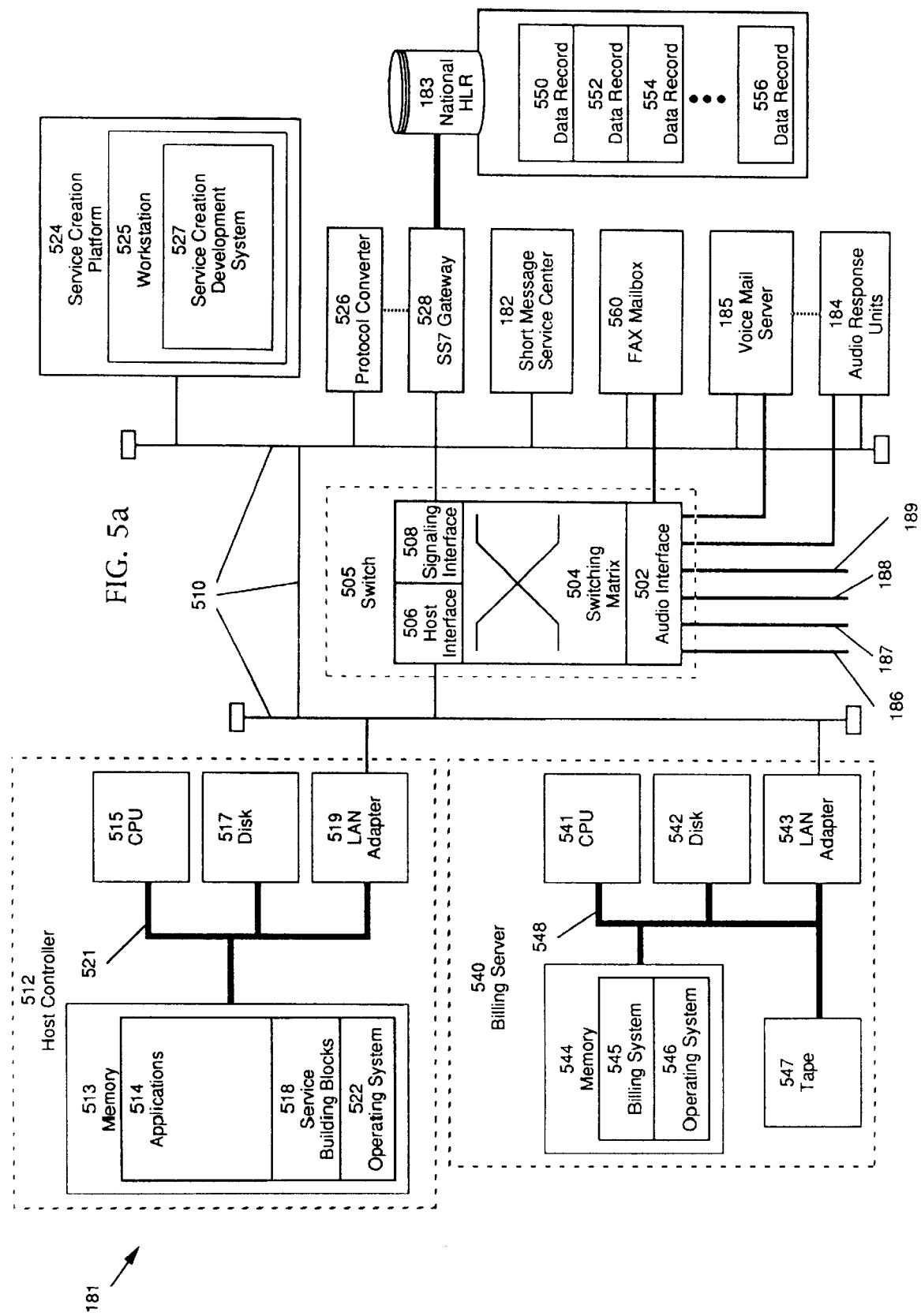
FIG. 5a is a block diagram of a wireless enhanced services platform (WESP) 181 and a national home location register (HLR) 183.

FIG. 5a is a block diagram of WESP 181 and national HLR 183. L-WESP is the same. Shown are telecommunications network lines 186, 187, 188 and 189 which couple WESP 181 to LDSs 151, 153, 155 and 157 through audio interface 502. WESP 181 includes switch 505. Switch 505 includes audio interface 502 which interfaces switch 505 to the telecommunications network. Audio interface 502 allows WESP 181 to connect to a variety of audio circuits. T1 is an example of a commonly used audio circuit, but others may also connect to WESP 181 through audio interface 502. Alternatively, WESP 181 may be directly connected to the MSC/VLR in a more distributed architecture. Switch 505 includes switching matrix 504 which connects to and switches the circuits of audio interface 502. Switch 505 also includes host interface 506 and signaling interface 508, both of which are connected to local area network 510 and to switching matrix 504.

Host controller 512 is connected to network 510 through LAN adapter 519. Host controller 512 includes CPU 515, Disk 517, LAN adapter 519 and memory 513 which are connected by bus 521. Memory 513 contains several software partitions 514, 518 and 522 which are executed by CPU 515. Memory 513 includes a plurality of applications 514. These applications perform the services and features which the WESP implements. Memory 513 includes service building blocks 518, which are modular routines used to create the applications which perform mobile telephone services. Memory 513 also includes operating system 522. Although only one host controller 512 is shown, it is well known in the art that it is equivalent to use multiple controllers connected to network 510, each controller including and executing operating system 522 and at least a portion of at least one of applications 514.

Host controller 512 controls switching matrix 504 by sending commands over network 510. These commands are received by host interface 506 and forwarded to switching matrix 504 which performs them. Host controller 512 also communicates with and controls SS7 gateway 528, protocol converter 526, short message service center 182, FAX mailbox 560, voice mail server 185 and audio response units 184 over network 510.

Billing server 540 is connected to network 510 through LAN adapter 543. Billing server 540 includes CPU 541, disk 542, LAN adapter 543, memory 544 and tape drive 547 which are connected by bus 548. Memory 544 contains software partitions 545 and 546 which are executed by CPU 541. Memory 544 includes billing system 545, which collects and processes billing data for calls handled by WESP 181. Memory 544 also includes operating system 546. Although only one billing server 540 is shown, it is well known in the art that it is equivalent to use multiple servers connected to network 510, each server including and executing operating system 546 and at least a portion of billing system 545.

Service creation platform 524 includes workstation 525. Workstation 525 contains and executes service creation development system 527 which allows service building blocks 518 to be combined to create new applications to run on host controller 512 and which perform new features. Although only one platform 524 is shown, it is well known in the art that multiple platforms 524 executing development system 527 could be connected to network 510 simultaneously.

Switching matrix 504 communicates with SS7 gateway 528, protocol converter 526, short message service server 182, FAX mailbox 560, voice mail server 185 and audio response units 184 over network 510 through signaling interface 508. Gateway 528 connects to network 510 and to national HLR 183 and conveys information between national HLR 183 and the remainder of WESP 181. Protocol converter 526 is connected to network 510 and to SS7 gateway 528 and provides conversion of protocols for information communicated using different protocols. Short message service center (SMSC) 182 connects to network 510 and handles processing and communication of non-voice messages to mobile stations. FAX mailbox 560 connects to network 510 and audio interface 502 and stores FAX data for later retrieval. Voice mail server (VMS) 185 connects to network 510, audio interface 502 and audio response units (ARU) 184. ARU 184 also connects to network 510 and audio interface 502. VMS 185 handles processing, storage and retrieval of voice and FAX messages in conjunction with ARU 184. ARU 184 issues audio instructions and receives audio commands and information from a caller. VMS 185 controls the audio interaction and processes the caller's responses.

National HLR 183 includes a plurality of data records 550, 552, 554 and 556. Each data record 550, 552, 554 and 556 contains information relating to a mobile station possessed by a subscriber to enhanced wireless service. Although only four data records 550, 552, 554 and 556 are shown, it is to be understood that national HLR 183 actually contains as many data records as there are mobile stations possessed by subscribers to enhanced wireless service.

Figure 5B:
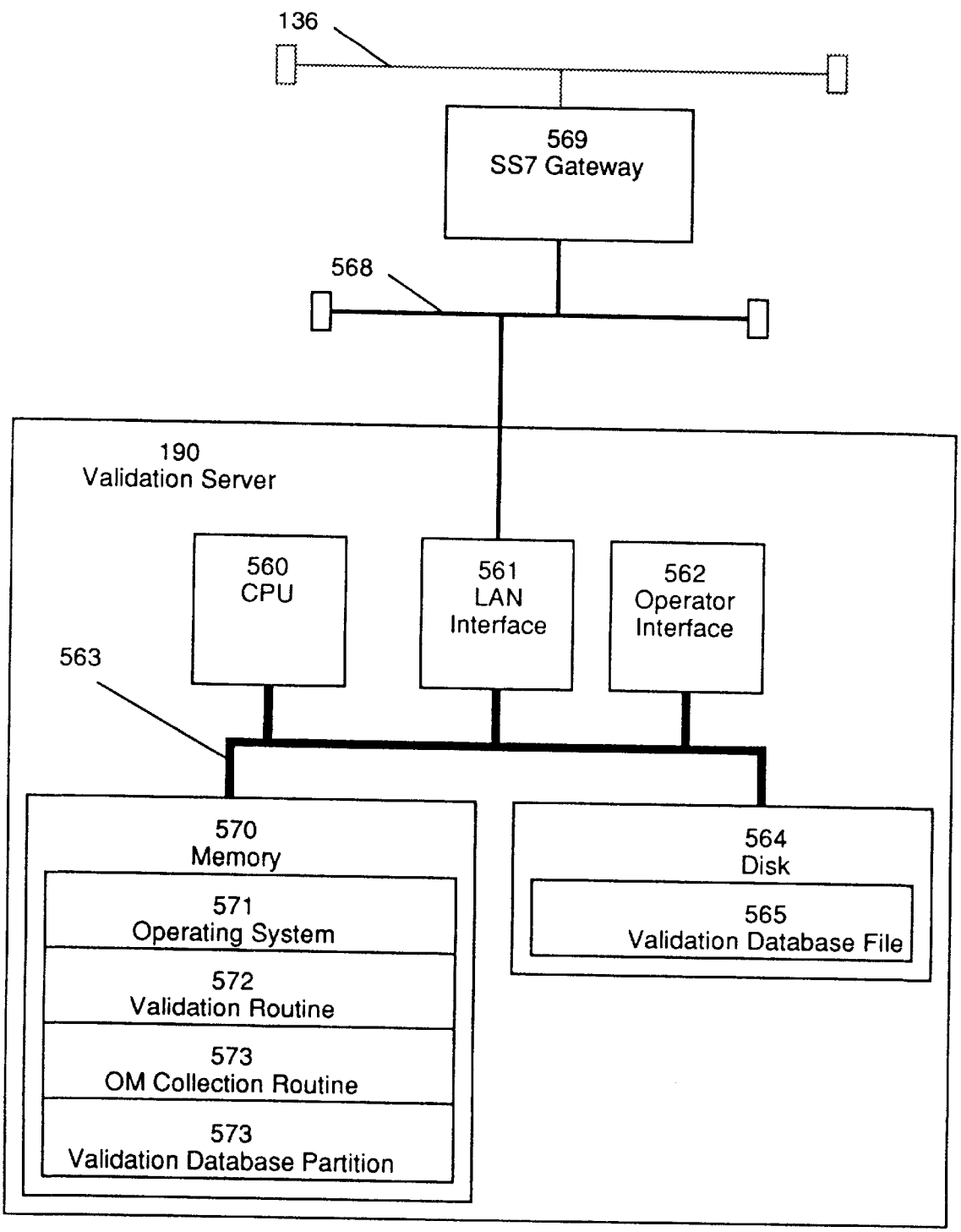
FIG. 5b is a block diagram of a validation server 190.

FIG. 5b is a block diagram of a validation server 190. Validation server 190 includes CPU 560, LAN interface 561, operator interface 562, memory 570 and disk 564, which are all connected by bus 563. LAN interface 561 connects to LAN 568. LAN 568 is a standard LAN such as, for example, Ethernet or Token Ring. LAN 568 connects to SS7 gateway 569 which provides necessary protocol translation between SS7 network 136 and LAN 568. Memory 570 includes Operating System 571, Validation Routine 572, OM Collection Routine 573, and Validation Database Partition 573. Disk 564 includes Validation Database File 565. A validation server is a server coupled to the SS7 network which provides a subset of the national HLR functions. In particular, a validation server provides validation of billing data, but does not provide routing functions. The purpose of a validation server is to off load some billing processing from the national HLR.

FIG. 5c is a format of a data record 550 stored on national HLR 183. Data record 550 includes a key field 590 containing the subscriber ID for the mobile station. In the case of the centralized embodiment of the invention, this field contains a non-geographic alias telephone number. In the case of the localized embodiment of the invention, this field contains a geographic telephone number. Data record 550 includes an indicator 592 of the serving MSC/VLR where the mobile station is actually located. Indicator 592 allows national HLR 183 to communicate with the serving MSC/VLR. Data record 550 also includes Features in Effect field 594, which indicates the features which are in effect for the mobile station.

FIG. 5d is a format of Features in Effect field 594. Although six subfields 594-1 to 594-6 are shown, the actual number of subfields will vary depending on the features actually implemented. Subfield 594-1 contains information relating to call forwarding. Such information includes an indicator of whether call forwarding to voice mail is available and the number to which calls are to be forwarded.

Subfield 594-2 contains information relating to billing features. Such information includes an indicator of the subscriber billing options, security level and any personal identification numbers (PIN). This information allows flexible billing features whereby a subscriber may choose to pay for all or part of the charges for an incoming or outgoing call. The billing option for the subscriber may be preset at subscription to apply to some or all incoming calls and some or all outgoing calls. In addition, a level of security may be placed on the billing method where for example, the subscriber chooses to pay only for incoming calls with a personal identification number (PIN). All other incoming calls would be charged to the calling party.

Subfield 594-3 contains information relating to FAX features. WESP 181 is capable of FAX call detection and of providing a different treatment for FAX calls. This allows the subscriber to use one telephone number to receive both FAX and voice calls. When an incoming call is delivered to WESP 181, WESP 181 would either recognize the bearer information in the signaling message or detect FAX tones and process the call as specified by FAX features subfield 594-3. One processing option is to send FAX calls to FAX mailbox 560 where the FAX would be stored for later retrieval by the subscriber.

Subfield 594-4 contains information relating to enhanced call forwarding features. Enhanced call forwarding allows a call which has been forwarded to be forwarded again if a busy or no answer condition is detected at the forwarded to number. Subfield 594-4 includes one or more additional forwarding numbers and options specifying the conditions under which each forwarding number is to be used.

Subfield 594-5 contains information relating to call screening features. Call screening allows a subscriber to accept calls only from people who have been supplied with a passcode number. When a call is placed to a mobile station with call screening in effect, the caller is prompted for the passcode. If the caller enters a correct passcode, the call is completed to the mobile station. Subfield 594-5 includes allowable passcodes and conditions for their use.

Subfield 594-6 contains information relating to additional features which may be developed in the future.

The same processes are used for both the centralized and localized embodiments of the invention. The only difference is that in the centralized embodiment, the call is received at an LDS and handled by WESP 181 and in the localized embodiment, the call is received at an EOS and handled by L-WESP 202.

Figure 6A:
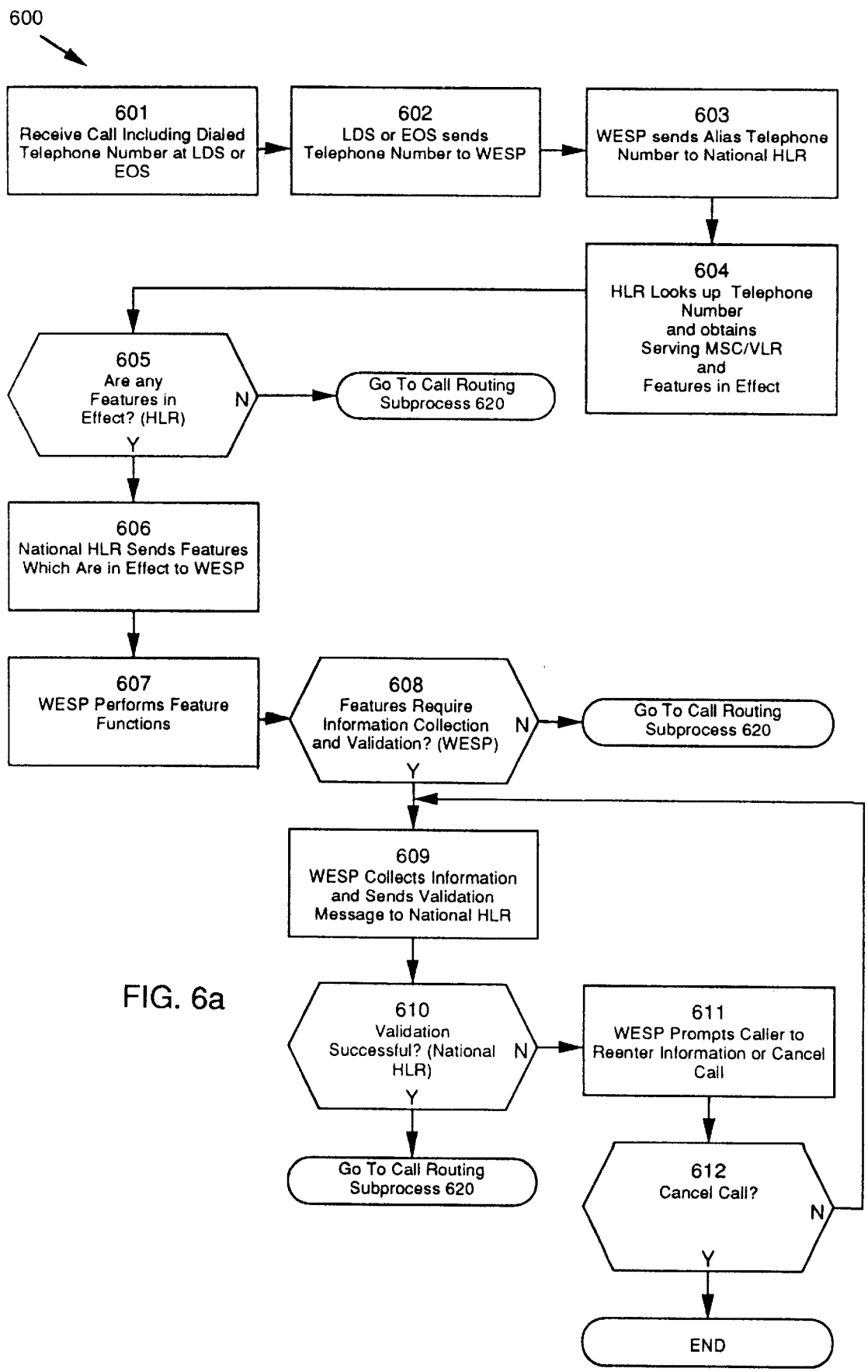
FIG. 6a is a flow diagram of a Call Completion Process 600.

FIG. 6a is a flow diagram of Call Completion Process 600. In step 601, a long distance switch (LDS) or alternatively, an end-office switch (EOS), receives a call to a destination mobile station. The call includes an indication of the dialed telephone number of the destination station. In step 602, the LDS or EOS sends the telephone number to the WESP. In step 603, the WESP sends the alias telephone number to national HLR 183. In step 604, national HLR 183 accesses its database, looks up the telephone number and retrieves an indicator of the serving MSC/VLR where the mobile station is actually located. National HLR 183 also retrieves the features which are in effect for the mobile station. In step 605, national HLR 183 determines whether any features are in effect. If there are none, the process continues with the Call Routing Subprocess 620. If there are features in effect, the process continues with step 606. In step 606, national HLR 183 sends a list of the features which are in effect to the WESP. In step 607, the WESP performs the functions necessary to implement the features which do not require information collection or validation. In step 608, the WESP determines whether any features in effect require information to be collected and validated. If not, the process continues with Call Routing Subprocess 620. If so, the process continues with step 609. In step 609, the WESP collects the required information and sends it in a validation message to national HLR 183. In step 610, national HLR 183 determines whether the validation is successful. If validation is successful, the process continues with the Call Routing Subprocess 620.

If validation is not successful, the process goes to step 611, in which the WESP prompts the caller to reenter the required feature information or cancel the call. In step 612, the process determines if the caller selected canceling the call or entering more information. If the caller chooses to enter more information, the process goes to step 609. If the caller chooses to cancel the call, the process terminates.

Figure 6B:
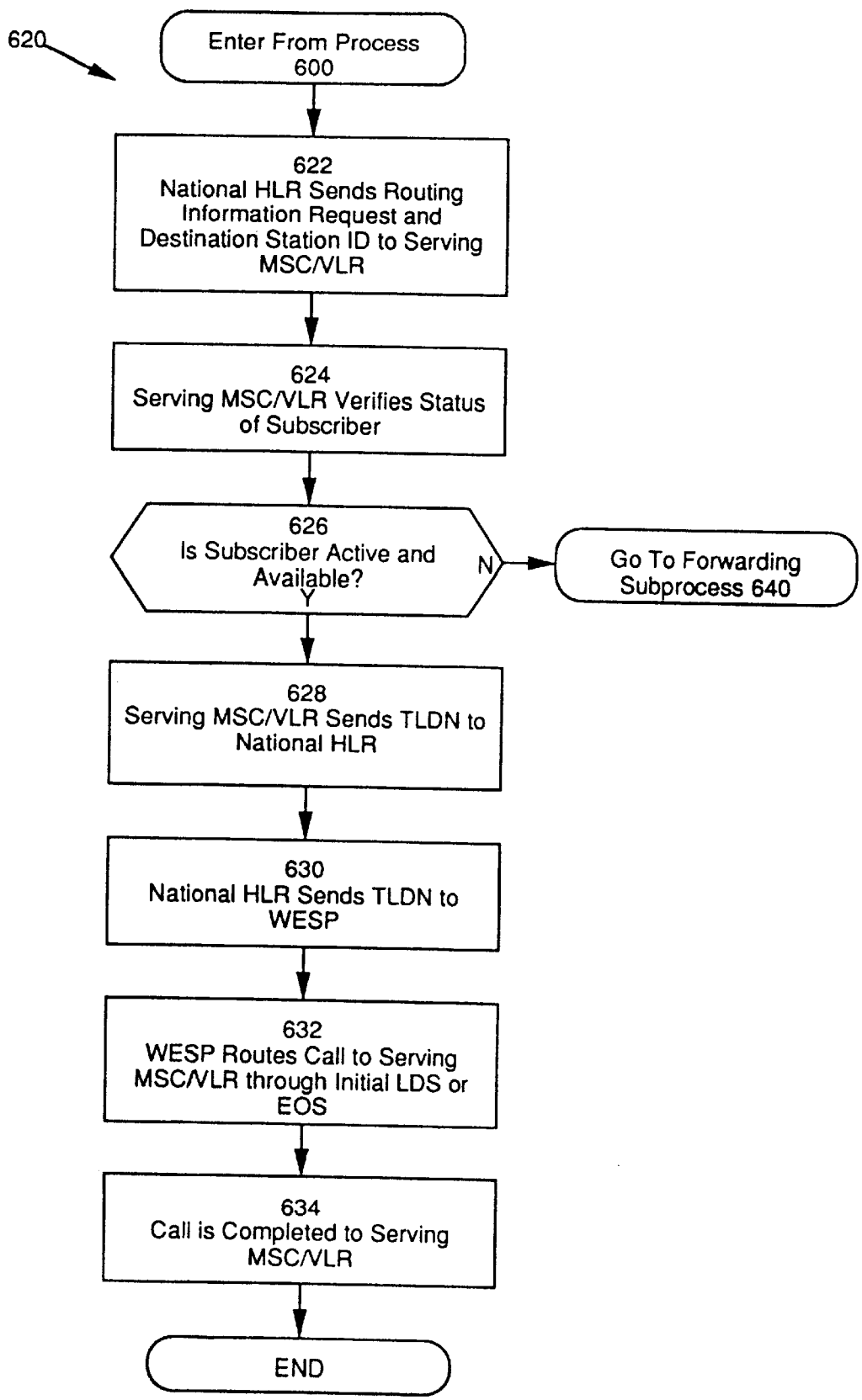
FIG. 6b is a flow diagram of a Call Routing Subprocess 620 which is entered from Call Completion Process 600.

FIG. 6b is a flow diagram of Call Routing Subprocess 620 which is entered from Call Completion Process 600. Call Routing Subprocess 620 begins in step 622, in which national HLR 183 sends a routing information request including an identifier of the destination station over a SS7 network to the serving MSC/VLR of the destination mobile station. In step 624, the serving MSC/VLR verifies the status of the subscriber. In step 626, the serving MSC/VLR determines whether the subscriber is active and available. If the destination station is not active and available, the process goes to forwarding subprocess 640. If the destination station is active and available, the process goes to step 628, in which the serving MSC/VLR sends the geographic routing number, the temporary local directory number (TLDN) of the destination station to national HLR 183. The TLDN is a geographic telephone number which is temporarily assigned by the serving MSC/VLR to the mobile station for as long as the mobile station is within the service area of that MSC/VLR. The TLDN allows a call to the mobile station to be routed to the serving MSC/VLR and from there to the mobile station. In step 630, national HLR 183 sends the TLDN of the destination station to the WESP. In step 632, the WESP routes the call to the serving MSC/VLR through the initial LDS or EOS. In step 634, the call is completed to the serving MSC/VLR. The process then ends.

Figure 6C:
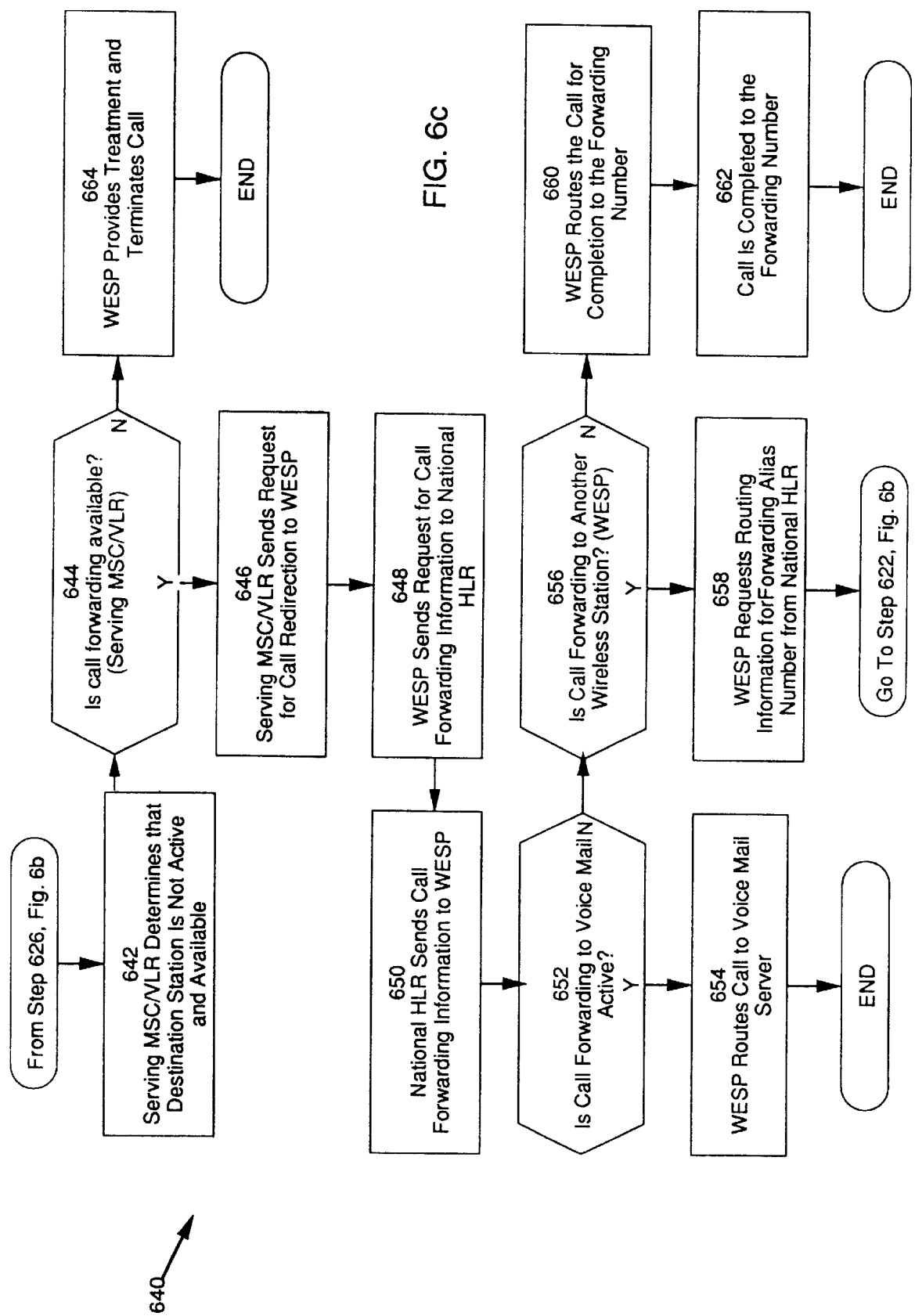
FIG. 6c is a flow diagram of a Call Forwarding Subprocess 640 which is entered from Call Routing Subprocess 620.

FIG. 6c is a flow diagram of forwarding subprocess 640. Subprocess 640 is entered from step 626 of FIG. 6b. Subprocess 640 begins in step 642, in which the serving MSC/VLR determines that the destination station is not active and available. In step 644, the serving MSC/VLR determines whether call forwarding is available for the destination station. If call forwarding is not available, the process goes to step 664, in which the WESP provides a treatment, such as a tone or a message, and terminates the call. The process then ends. If call forwarding is available, the process goes to step 646, in which the serving MSC/VLR sends a request for call redirection to the WESP. In step 648, the WESP sends a request for call forwarding information to national HLR 183. In step 650, national HLR 183 sends the call forwarding information to the WESP. In step 652, the WESP verifies the status of call forwarding service for the destination station. If call forwarding to voice mail is active, the process goes to step 654, in which the WESP routes the call to voice mail server 185. The process then ends. If call forwarding to voice mail is not active, the process goes to step 656.

In step 656, the WESP determines if the call is to be forwarded to another mobile station served by the WESP. If the call is to be forwarded to another such station, the process goes to step 658, in which the WESP requests routing information for the forwarding telephone number from national HLR 183. The process then goes to step 622 of FIG. 6b and repeats Call Routing Subprocess 620 for the forwarding telephone number. If the call is to be forwarded to a mobile station not served by the WESP or to a landline telephone, the process goes to step 660. In step 660, the WESP routes the call for completion to the forwarding number. In step 662, the call is completed to the forwarding number. The process then ends.

Figure 6D:
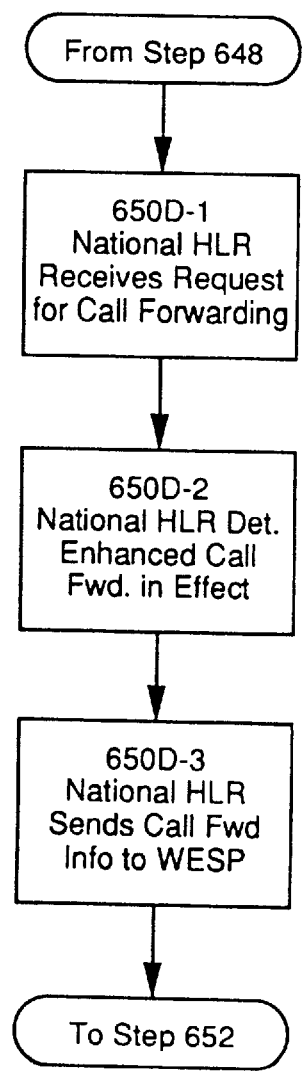
FIG. 6d is a flow diagram of the subprocess of step 650 of FIG. 6c for the case of enhanced call forwarding.

FIG. 6d is a flow diagram of the subprocess of step 650 of FIG. 6c for the case of enhanced call forwarding. Enhanced call forwarding allows a call which has been forwarded to be forwarded again if a busy or no answer condition is detected at the first forwarding number. In step 650D-1, national HLR 183 receives a request for call forwarding information from WESP 183. In step 650D-2, national HLR 183 accesses the call forwarding information and determines that enhanced call forwarding is in effect. In step 650D-3, national HLR 183 sends the call forwarding information to the WESP. The call forwarding information includes the forwarding number, an indicator of whether forwarding to voice mail is active and an indicator of whether enhanced call forwarding is in effect. Here, enhanced call forwarding is in effect, so when the WESP completes the call to the forwarding number, it will stay on the line until the call is answered. If a busy or no answer condition is detected, the WESP will repeat Call Forwarding Subprocess 640 for each forwarding number specified in enhanced call forwarding field 594-4.

Figure 6E:
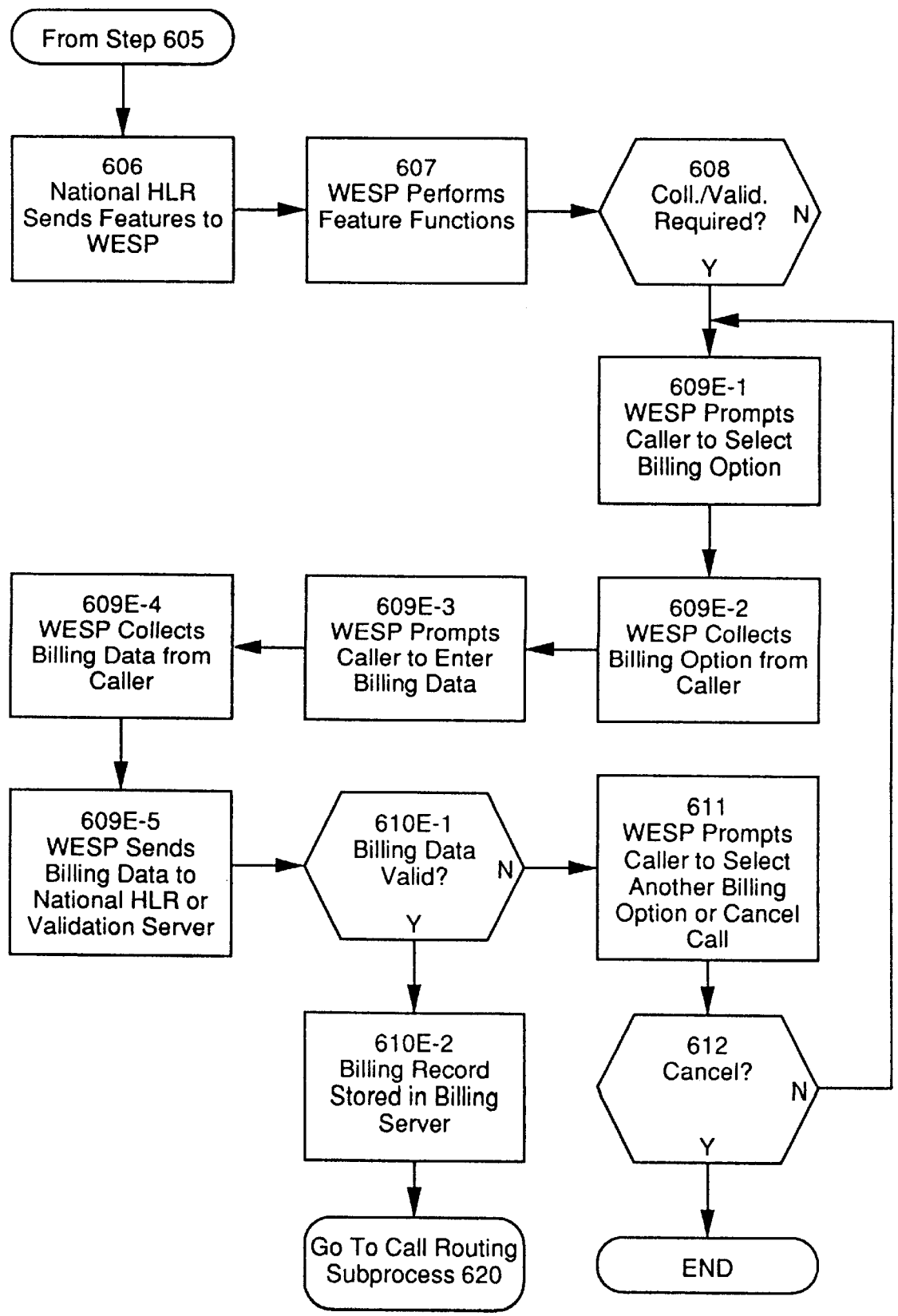
FIG. 6e is a flow diagram of Call Completion Process 600 for the case of flexible billing features.

FIG. 6e is a flow diagram of Call Completion Process 600 for the case of flexible billing features. FIG. 6e begins at step 606, in which National HLR 183 sends the features in effect to the WESP. In step 607, the WESP performs the functions necessary to implement the features which do not require information collection or validation. In step 608, the WESP determines whether any features in effect require information collection or validation. Here, the flexible billing features do require information collection and validation. In step 609, the WESP collects the necessary information and sends it in a validation message to national HLR 183. FIG. 6e shows the steps of the subprocess of step 609 for tbe flexible billing features. In step 609E-1, the WESP prompts the caller to select a billing option from those available for the called party. Such billing options may include: bill to credit card, bill to third number, bill to called party, bill all charges (including airtime) to caller, etc. In step 609E-2, the WESP collects the billing option selected. In step 609E-3, the WESP prompts the caller to enter billing data. The data which must be entered depends on the billing option selected, but may include: a credit card number, a third party number, a personal identification number, etc. In step 609E-4, the WESP collects the entered billing data from the caller. In step 609E-5, the WESP sends the billing data in a validation message. The message may be sent to national HLR 183 or alternatively, the message may be sent to an appropriate validation server 190. FIG. 6e shows the steps of the subprocess of step 610 for the flexible billing features. In step 610E-1, national HLR 183 validates the billing data. If validation is successful, the process goes to step 610E-2, in which the billing record for the transaction is stored in billing server. The process then continues with Call Routing Subprocess 620.

If validation is not successful, the process goes to step 611, in which the WESP prompts the caller to select another billing option, retry the same billing option and reenter the billing data, or cancel the call. In step 612, the process determines if the caller selected canceling the call or entering more information. If the caller chooses to select another billing option or retry the same option, the process goes to step 609E-1. If the caller chooses to cancel the call, the process terminates.

Figure 6F:
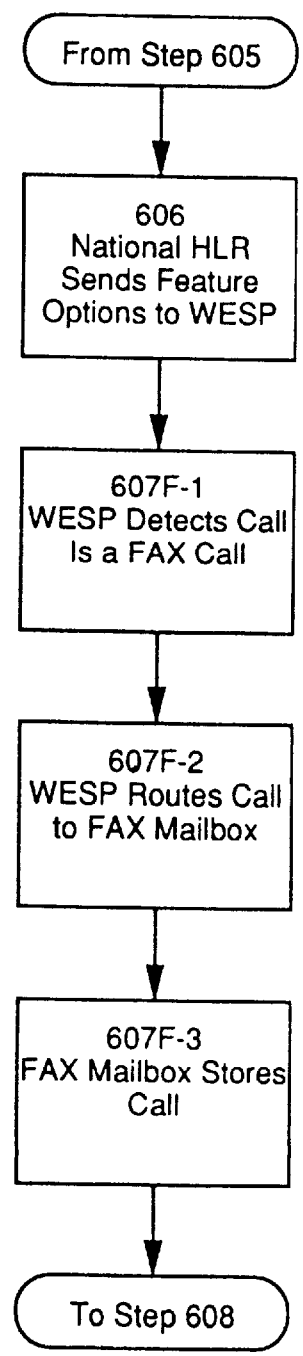
FIG. 6f is a flow diagram of Call Completion Process 600 for the case of a FAX feature call.

FIG. 6f is a flow diagram of Call Completion Process 600 for the case of a FAX feature call. FIG. 6f begins at step 606, in which National HLR 183 sends the features in effect to the WESP. In step 607, the WESP performs the functions necessary to implement the features which do not require information collection or validation. FIG. 6f shows the steps of the subprocess of step 607 for a FAX feature call. In step 607F-1, the WESP detects that the call is a FAX call. In step 607F-2, the WESP routes the call to FAX mailbox 560. In step 607F-3, FAX mailbox 560 stores the FAX for later retrieval by the subscriber. The process then continues with step 608.

Figure 6G:
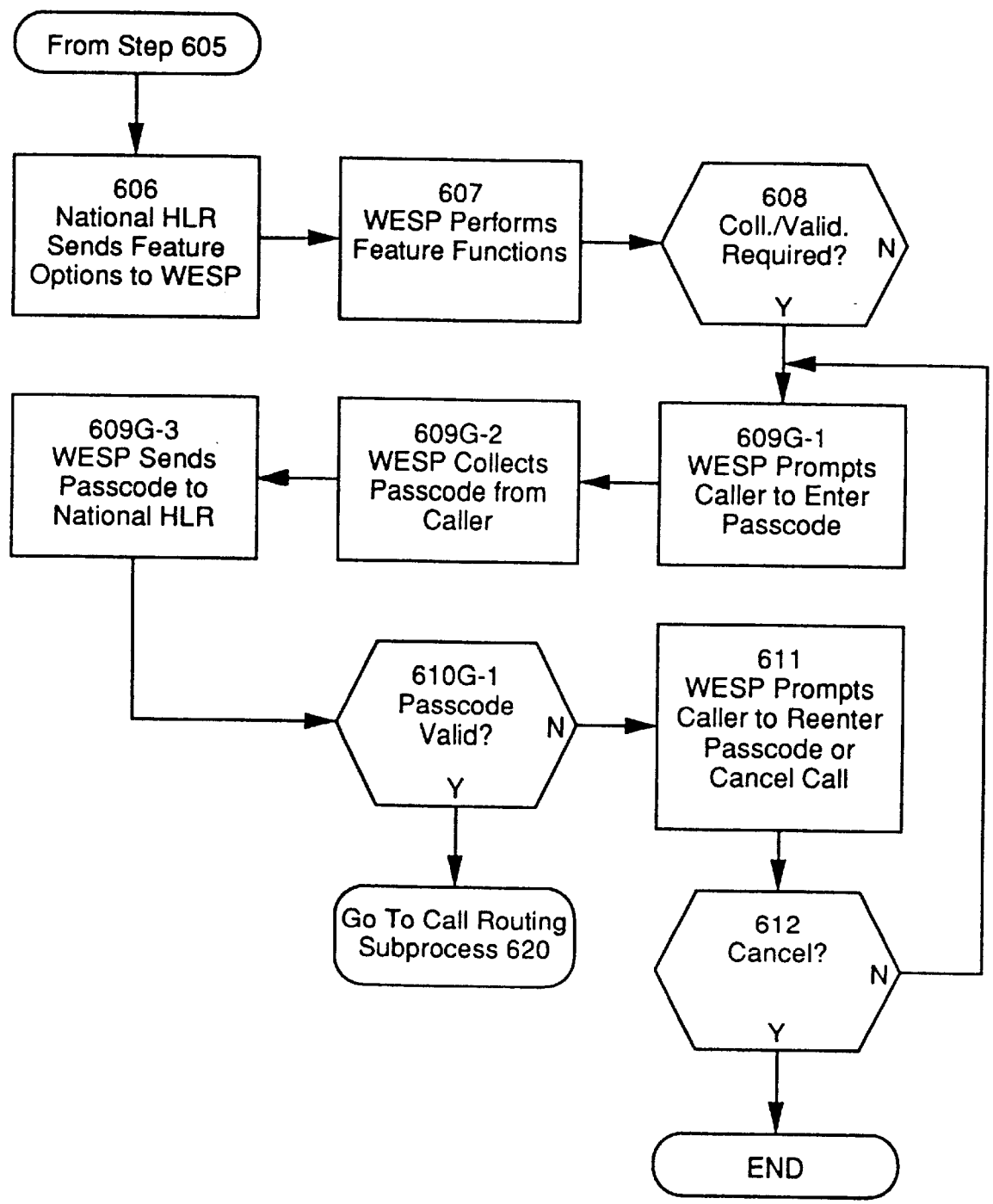
FIG. 6g is a flow diagram of Call Completion Process 600 for the case of call screening.

FIG. 6g is a flow diagram of Call Completion Process 600 for the case of call screening. FIG. 6g begins at step 606, in which National HLR 183 sends the features in effect to the WESP. In step 607, the WESP performs the functions necessary to implement the features which do not require information collection or validation. In step 608, the WESP determines whether any features in effect require information collection or validation. Here, call screening does require information collection and validation. In step 609, the WESP collects the necessary information and sends it in a validation message to national HLR 183. FIG. 6g shows the steps of the subprocess of step 609 for call screening. In step 609G-1, the WESP prompts the caller to enter a passcode. In step 609G-2, the WESP collects the passcode entered. In step 609G-3, the WESP sends the passcode in a validation message to national HLR 183. FIG. 6g shows the steps of the subprocess of step 610 for the case call screening. In step 610G-1, national HLR 183 validates the passcode. If validation is successful, the process continues with Call Routing Subprocess 620.

If validation is not successful, the process goes to step 611, in which the WESP prompts the caller to reenter the passcode or cancel the call. In step 612, the process determines if the caller selected canceling the call or reentering the passcode. If the caller chooses to reenter the passcode, the process goes to step 609G-1. If the caller chooses to cancel the call, the process terminates.

Figure 7:
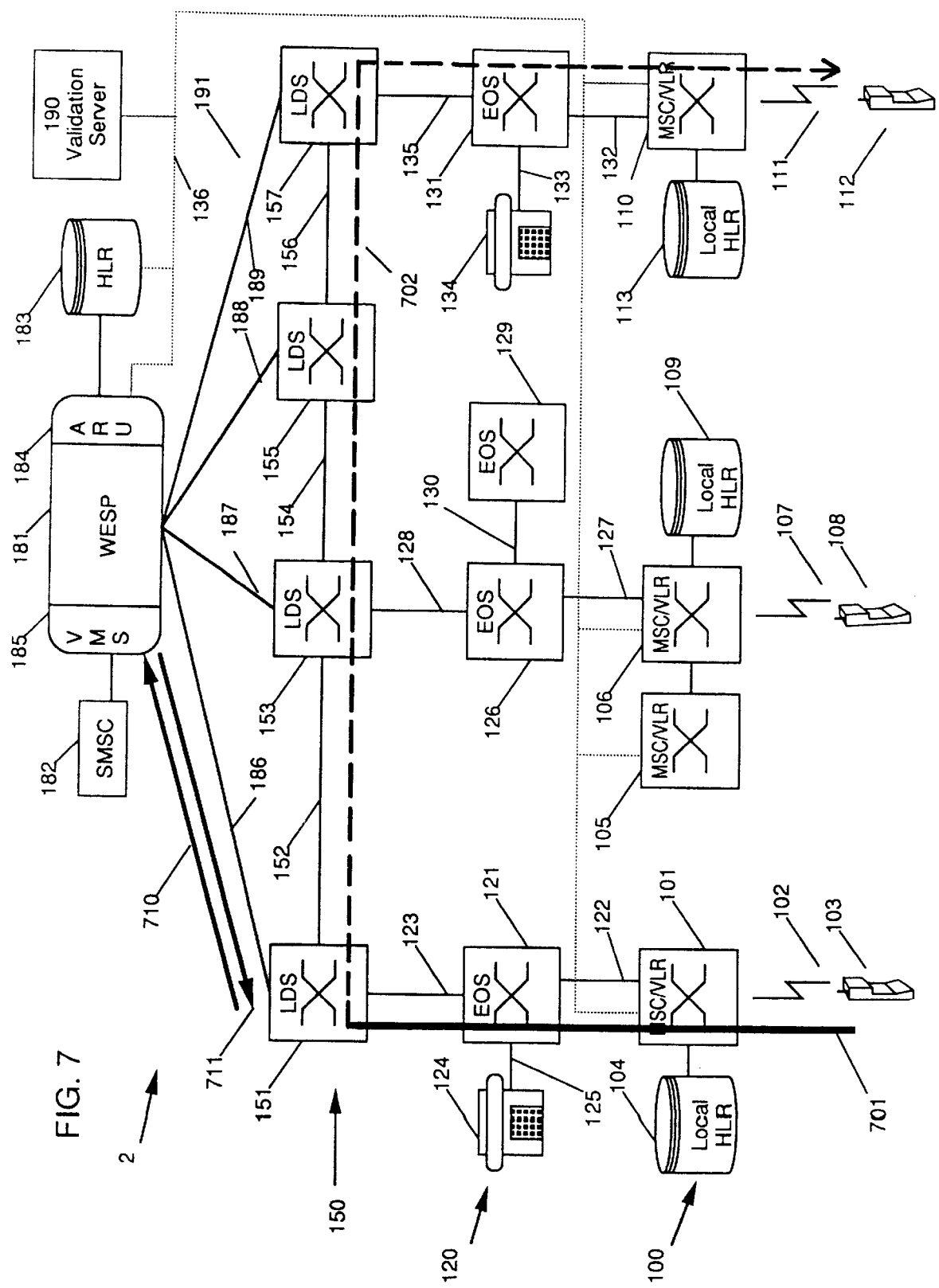
FIG. 7 is a representation of the routing of a normally completed call, in accordance with the centralized embodiment of the invention.

FIG. 7 is a representation of the routing of a normally completed call which is produced by Call Completion Process 600 in cellular network 2 in accordance with the centralized embodiment of the invention. It is best understood with reference to FIGS. 6a, 6b and 6c. Subscriber station 112 is present in its home area at MSC/VLR 110. When a call is placed from originating subscriber station 103 to destination subscriber station 112 or alternatively from land-line telephone 124 to station 112, the call is routed along path 701 from station 103 to MSC/VLR 101 to EOS 121 or alternatively from land-line telephone 124 to EOS 121. EOS 121 determines from the special area code that the telephone number is an alias of a particular long distance vendor, so EOS 121 routes the call along path 701 to that vendor's long distance switch, LDS 151. LDS 151 recognizes the telephone number as an alias and sends message 710 communicating the alias telephone number over line 186 to WESP 181. WESP 181 processes the telephone number with Call Completion Process 600 and routes the call to MSC/VLR 110. In this case the destination subscriber station is located in its home area, so in step 628 of FIG. 6b, serving/home MSC/VLR 110 sends the home geographic number of the destination terminal to national HLR 183. This results in the call being completed through MSC/VLR 110. In step 630 of FIG. 6b, a message containing the geographic routing number is sent from national HLR 183 to WESP 181. WESP 181 sends message 711 containing the routing information to LDS 151. LDS 151 then completes the call along path 702 as follows: from LDS 151, to LDS 153, to LDS 155, to LDS 157, to EOS 131, to MSC/VLR 110. MSC/VLR 110 then completes the call to station 112 over radio link 111.

Figure 8:
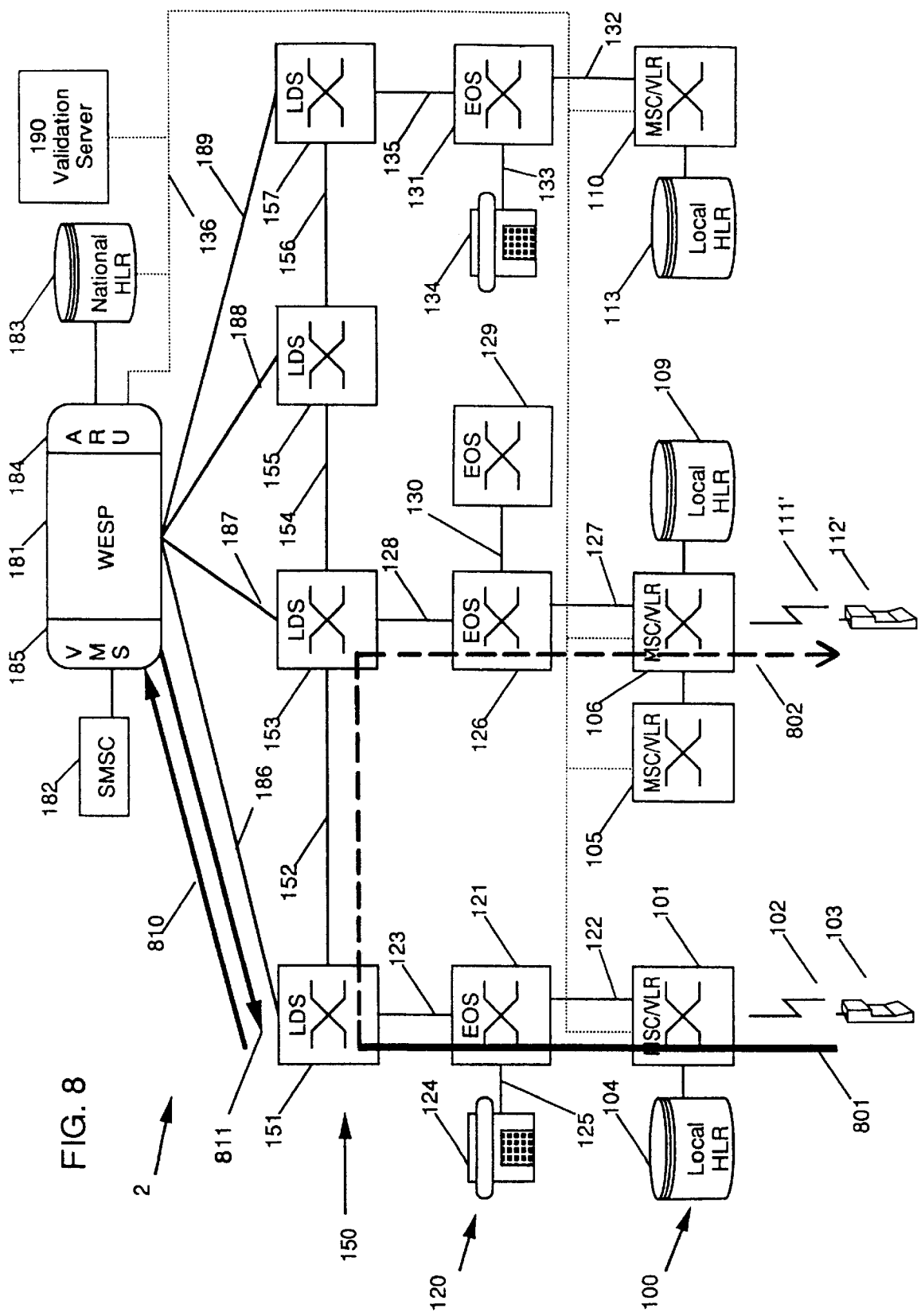
FIG. 8 is a representation of the routing of a call completed to a subscriber station that has roamed outside its home area, in accordance with the centralized embodiment of the invention.

FIG. 8 is a representation of the routing of a call completed to a subscriber station that has roamed outside its home area produced by Call Completion Process 600 in cellular network 2 in accordance with the centralized embodiment of the invention. It is best understood with reference to FIGS. 6a, 6b and 6c. Subscriber station 112' has roamed away from its home area at MSC/VLR 110 to the area of MSC/VLR 106. When a call is placed from originating subscriber station 103 to destination subscriber station 112' or alternatively from land-line telephone 124 to station 112', the call is routed along path 801 from station 103 to MSC/VLR 101 to EOS 121 or alternatively from land-line telephone 124 to EOS 121. EOS 121 determines from the special area code the telephone number is an alias of a particular long distance vendor, so EOS 121 routes the call along path 801 to that vendor's long distance switch, LDS 151. LDS 151 recognizes the telephone number as an alias and sends message 810 communicating the alias telephone number over line 186 to WESP 181. WESP 181 processes the telephone number with Call Completion Routine 600 and routes the call to MSC/VLR 106. In this case, the destination subscriber station is roaming in the service area of MSC/VLR 106. In step 628 of FIG. 6b, serving MSC/VLR 106 sends the geographic routing number, the temporary local directory number (TLDN), it assigned to roaming station 112'. This results in the call being completed through MSC/VLR 106. In step 630 of FIG. 6b, a message containing the geographic routing number is sent from national HLR 183 to WESP 181. WESP 181 sends message 811 containing the routing information to LDS 151. LDS 151 then completes the call along path 802 as follows: from LDS 151, to LDS 153 to EOS 126, to MSC/VLR 106. MSC/VLR 106 then completes the call to station 112' over radio link 111'. This routing result makes use of fewer network resources than the current art.

Figure 9:
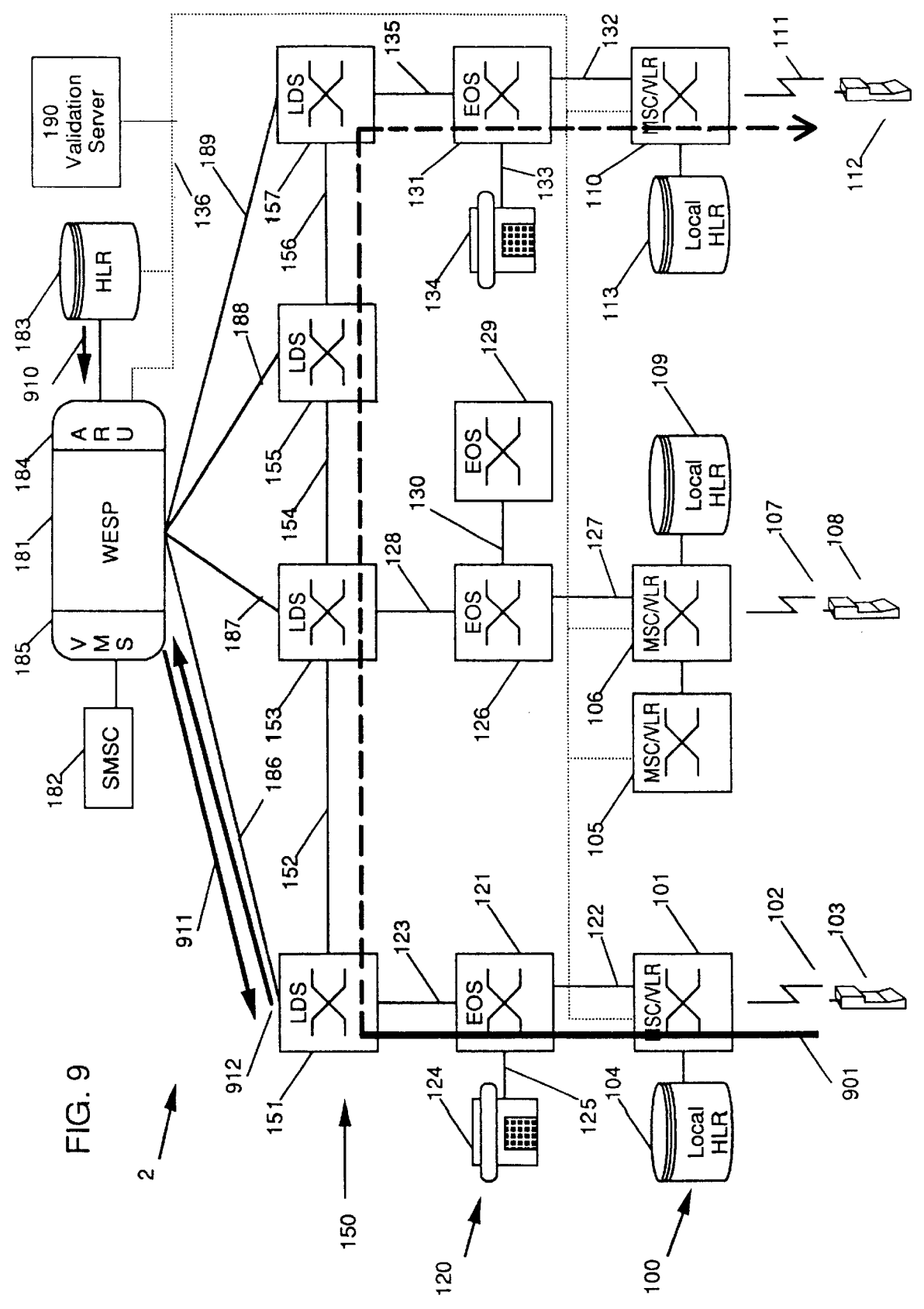

FIG. 9 is a representation of the implementation of new services on a nationwide basis in cellular network 2 in accordance with the centralized embodiment of the invention. It is best understood with reference to FIGS. 6a, 6b and 6c. The feature of call screening is used here as an example. Only people who have been supplied with a passcode number are allowed to call the subscriber. A call is placed from subscriber station 103 to station 112 or alternatively from land-line telephone 124 to station 112 using the non-geographic alias telephone number. The call goes from station 103 to MSC/VLR 101 to EOS 121 or alternatively from land-line telephone 124 to EOS 121, to LDS 151. The call is then processed according to Call Completion Process 600. In step 604 of FIG. 6a, the feature information returned by national HLR 183 in message 910 is that station 112 has call screening in effect. In step 609 of FIG. 6a, WESP 181 performs the functions to implement the feature. In this case, call screening is implemented as follows: a subsystem of WESP 181, the audio response unit (ARU), plays a voice announcement 911 to the subscriber on station 103 using the current voice channel: WESP 181 to LDS 151, to EOS 121, to MSC/VLR 101, to station 103. The voice announcement instructs the subscriber on station 103 to enter the passcode for access to station 112. The subscriber on station 103 enters the passcode which is conveyed to WESP 181 in message 912. This feature requires validation, so the process proceeds through steps 608 to 610 of FIG. 6a. If the correct passcode was entered, the validation is successful and the call is completed by Call Routing Subprocess 620 of FIG. 6a along path 902. If an incorrect passcode was entered, the call is canceled in step 611 of FIG. 6a. The feature is nationwide in scope because the feature works even if no local MSC/VLRs and HLRs possess the feature. Only WESP 181 and national HLR 183 need possess the feature.

Figure 10:
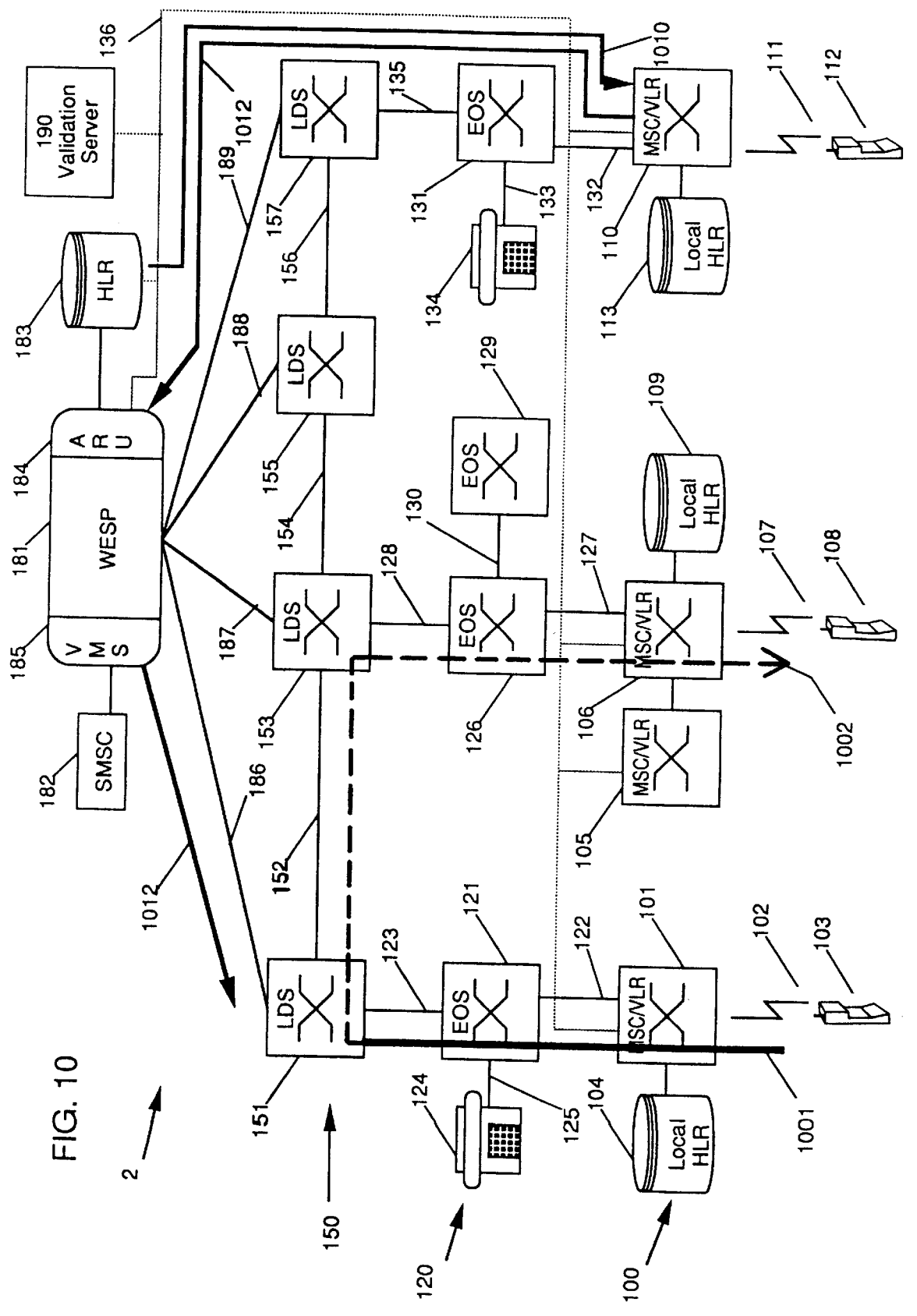

FIG. 10 is a representation of the routing which occurs when the destination station does not answer or is busy and call forwarding is active, in cellular network 2 in accordance with the centralized embodiment of the invention. It is best understood with reference to FIGS. 6a, 6b and 6c. Subscriber station 103 places a call to station 112 or alternatively a call is placed from land-line telephone 124 to station 112. EOS 121 determines from the telephone number that the call is long distance and routes it to LDS 151. LDS 151 analyzes the telephone number and identifies it as belonging to a cellular telephone. As a result, LDS 151 then communicates about the call with WESP 181. WESP 181 processes the telephone number with Call Completion Process 600 and attempts to route the call with Call Routing Subprocess 620. In step 622 of FIG. 6b, national HLR 183 sends a routing information request 1010 to serving MSC/VLR 106 over SS7 network 136. In step 624 of FIG. 6b, MSC/VLR 106 detects that the subscriber does not answer the call, or that the destination station 112 is busy. In step 646 of FIG. 6c, MSC/VLR 106 sends a request for call redirection 1011 to WESP 183 over SS7 network 136. Request 1011 is processed in accordance with the remaining steps of Call Forwarding Subprocess 640. WESP 181, initiates a call to the forwarding number, in this example the number of station 108, and sends message 1012 to LDS 151 to complete the call to MSC/VLR 106 along path 1002. The resulting call is routed using only the links that are actually needed. This uses fewer resources than the current art.

Figure 11:
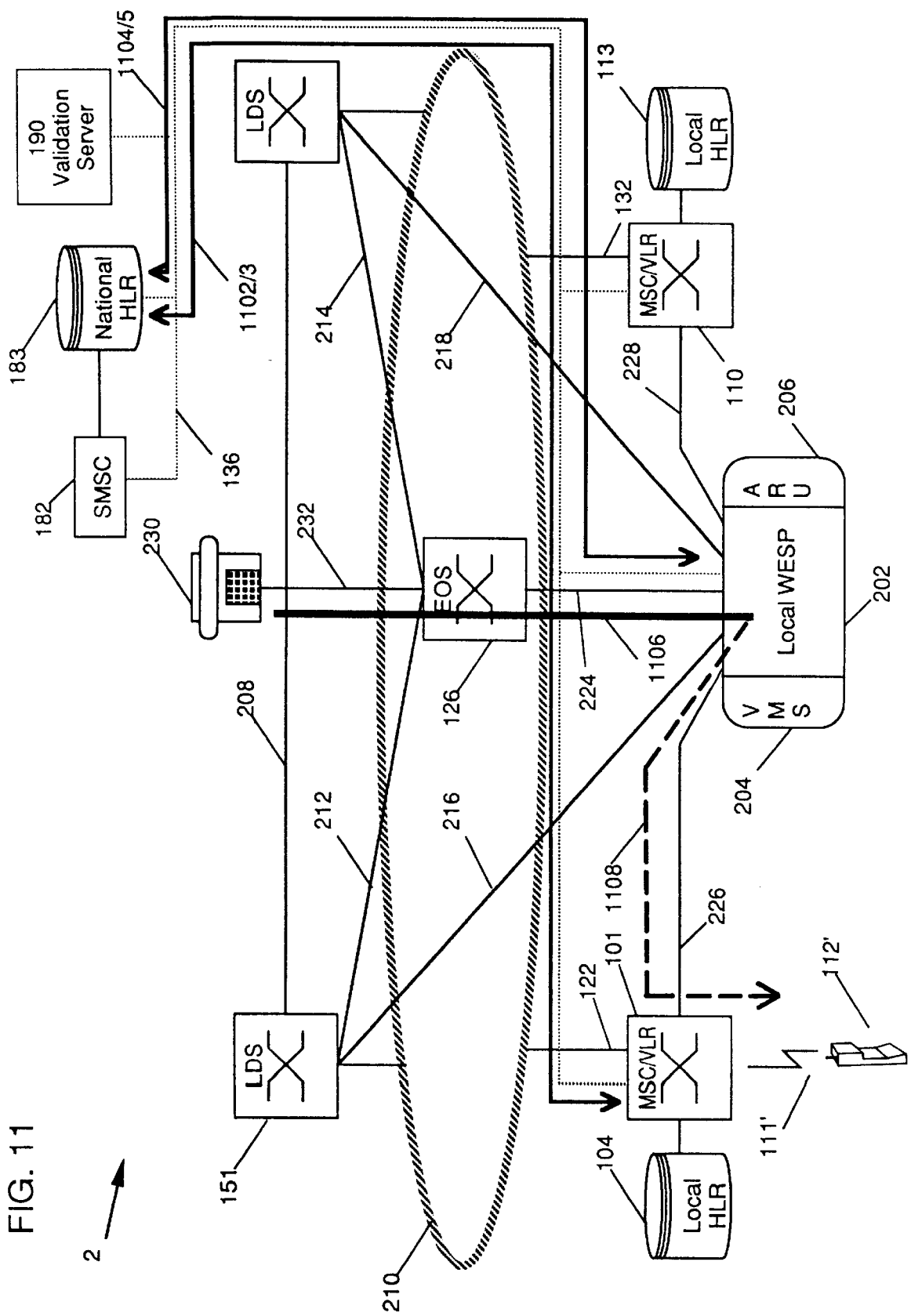
FIG. 11 is a representation of the routing of a call completed to a subscriber station that has roamed outside its home area, in accordance with the localized embodiment of the invention.

FIG. 11 is a representation of the routing of a call completed to a subscriber station that has roamed outside its home area produced by Call Completion Process 600 in cellular network 2 in accordance with the localized embodiment of the invention. It is best understood with reference to FIGS. 6a, 6b and 6c. Landline telephone 230 places a call to mobile station 112'. EOS 126 determines that the call is destined for a mobile station and routes the call along path 1106 to L-WESP 202. L-WESP 202 sends a request 1104 for routing information to national HLR 183. National HLR 183 locates the serving MSC/VLR 101 and sends request 1102 for the TLDN. MSC/VLR 101 sends a message 1103 including the TLDN to national HLR 183. National HLR 183 sends a message 1105 including the TLDN to L-WESP 202. The call is then completed along path 1108 from L-WESP to serving MSC/VLR 101 to roaming subscriber 112'.

Figure 12:
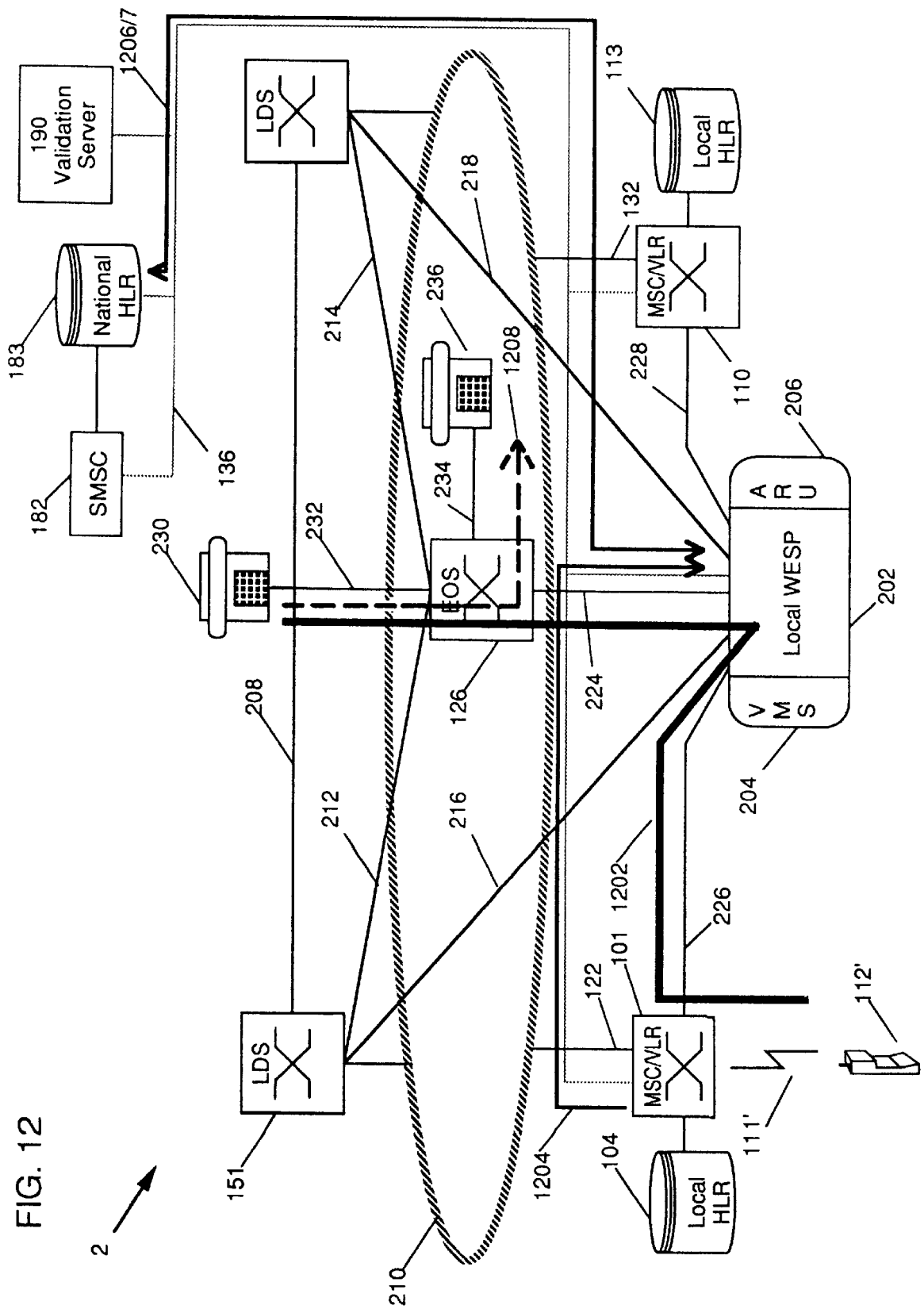
FIG. 12 is a diagram of the routing which occurs when the destination station does not answer or is busy and call forwarding is active, in accordance with the localized embodiment of the invention.

FIG. 12 is a representation of the routing which occurs when the destination station does not answer or is busy and call forwarding is active, in cellular network 2 in accordance with the localized embodiment of the invention. It is best understood with reference to FIGS. 6a, 6b and 6c. Landline telephone 230 places a call to mobile station 112'. Call Completion Process 600 routes the call over path 1202 to serving MSC/VLR 101. Mobile station 112' does not answer the call, so MSC/VLR 101 sends message 1204 over SS7 network 136 to L-WESP 202 requesting the call be redirected. L-WESP 202 sends message 1206 to national HLR 183 requesting forwarding information. National HLR 183 sends forwarding information 1207 to L-WESP 202. The call is then routed and completed along path 1208 to landline telephone 236. L-WESP 202 then releases connection 1202 to MSC/VLR 101.

It is seen that the present invention solves the problem of two separate circuits being used when a call to a subscriber station is forwarded or when the station is roaming. The call is routed directly to its ultimate destination. It is not routed by way of the home MSC/VLR of the subscriber station. Since all features are implemented by the WESP and national HLR, all features are nationwide in scope and are thus introduced simultaneously nationwide. This solves the problems of inconsistent service availability and lengthy service introduction periods.

Although specific embodiments have been disclosed, it will be seen by those of skill in the art that there are other embodiments possible which are equivalent to those disclosed.

What is claimed is:

1. In a mobile radio communications network having multiple network switches and a plurality of mobile switching center/visitor location registers, a system for completing calls to mobile stations, comprising:

a wireless enhanced services platform coupled to at least one network switch of an incoming call to a mobile station, said platform including a controller and switching means for routing calls in response to commands from said controller, said platform adaptable to interface with long distance switches or directly with each of said plurality of mobile switching center/visitor location registers; and a national home location register, coupled to said platform, for storing a plurality of data records including features relating to said mobile stations, said national home location register interactively working with said platform;

wherein, in receipt of the call number of said incoming call to said mobile station, said platform routes said call number to the mobile switching center/visitor location register where said mobile station is located, said mobile switching center/visitor location register, in response, sending routing information relating to the destination of said mobile station to said national home register; and wherein, in receipt of said routing information, said national location register sends a message containing said routing information and any feature relating to said mobile station to said platform, said platform routing said message to said at least one network switch, said at least one network switch utilizing said routing information to route said call to said mobile station.

2. The system of claim 1, wherein said platform comprises:

controller is coupled to said network switch for generating an output control signal in response to an input signal indicative of a destination mobile station for a call, said wireless enhanced services platform further comprising:

a switch, coupled to said controller and said at least one network switch, operative for connecting input audio voice circuits to output audio voice circuits in response to said output control signal from said host controller, and for generating first and second output signals;

a voice mail server, coupled to at least one output audio voice circuit of said switch, for storing audio voice messages in response to said first output signal from said network switch; and an audio response unit, coupled to at least one input audio voice circuit of said switch, for outputting audio voice messages in response to said second output signal from said switch.

3. The system of claim 2, further comprising:

an SS7 network coupled to said wireless enhanced services platform, said national home location register and said mobile switching center/visitor location registers.

4. The system of claim 2 wherein said wireless enhanced services platform further comprises a FAX mailbox.

5. The system of claim 1, wherein said at least one network switch comprises a long distance switch.

6. The system of claim 1, wherein each data record in said national home location register comprises:

a non-geographic alias telephone number for providing the identify of a given mobile station;

an indicator of the mobile service center/visitor location register serving said given mobile station; and an indicator of the features in effect for said given mobile station.

7. The system of claim 6, further comprising:

a plurality of long distance switches coupled to said wireless enhanced services platform; and a plurality of mobile switching center/visitor location registers coupled to said wireless enhanced services platform.

8. The system of claim 2, wherein said at least one network switch comprises a local switch.

9. The system of claim 8, wherein each data record in said national home location register comprises:

a geographic telephone number for providing the identity of a given mobile station;

an indicator of the mobile service center/visitor location register serving said given mobile station; and an indicator of the features in effect for said given mobile station.

10. The system of claim 9, further comprising:

a plurality of local switches coupled to said wireless enhanced services platform; and a plurality of mobile switching center/visitor location registers coupled to said wireless enhanced services platform.

11. The system of claim 1, wherein said national home location register has stored therein for said mobile station a list of features in effect for said mobile station, said list of features being sent to said wireless enhanced services platform in receipt of said call number so that necessary functions may be performed by said wireless enhanced services platform to implement said features.

12. In a mobile radio communications network comprising at least one network switch, at least one wireless enhanced services platform, at least one national home location register, and a plurality of mobile switching center/visitor location registers, a method for completing calls to a destination mobile station comprising the steps of:

A) receiving a call placed by a caller, the call including an indicator of a destination mobile station, at a network switch;

B) transmitting the indicator of the destination mobile station from the network switch to a wireless enhanced services platform;

C) transmitting the indicator of the destination mobile station from the wireless enhanced services platform to a national home location register;

D) obtaining an indicator of a serving mobile service center/visitor location register and an indicator of features in effect at the national home location register;

E) completing the call, if there are no features in effect;

F) transmitting the indicator of features in effect from the national home location register to the wireless enhanced services platform, if there are features in effect;

G) performing the functions necessary to implement the features in effect which do not require information collection or validation, in the wireless enhanced services platform;

H) determining whether any features in effect require information collection or validation at the wireless enhanced services platform;

I) completing the call, if no features require information collection or validation;

J) collecting information required to perform a feature at the wireless enhanced services platform, if a feature requires information to be collected;

K) transmitting collected information which requires validation from the wireless enhanced services platform to the national home location register;

L) validating the collected information which requires validation at the national home location register;

M) determining whether to cancel the call, if validation is unsuccessful; and

N) completing the call, if validation is successful.

13. The method of claim 12, wherein the step of determining whether to cancel the call comprises the steps of:

A) prompting the caller to select whether to reenter information or cancel the call, from the wireless enhanced services platform;

B) repeating the steps of collecting, transmitting and validating information and the step of determining whether to cancel the call, if the caller selects to reenter information; and C) canceling the call at the wireless enhanced services platform, if the caller selects to cancel the call.

14. The method of claim 13, wherein the step of completing the call comprises the steps of:

A) transmitting a routing information request including the indicator of the destination mobile station from the national home location register to the serving mobile switching center/visitor location register;

B) verifying the status of the destination mobile station at the serving mobile switching center/visitor location register;

C) forwarding the call, if the destination mobile station is not active and available;

D) transmitting a routing indicator for the destination mobile station from the serving mobile switching center/visitor location register to the national home location register, if the destination mobile station is active and available;

E) transmitting the routing indicator from the national home location register to the wireless enhanced services platform;

F) routing the call to the serving mobile service center/visitor location register through the network switch; and G) completing the call to the serving mobile service center/visitor location register.

15. The method of claim 14, wherein the step of forwarding the call comprises the steps of:

A) determining whether call forwarding is available for the destination mobile station at the serving mobile service center/visitor location register;

B) providing a treatment and terminating the call at the wireless enhanced services platform, if call forwarding is not available for the destination mobile station;

C) transmitting a request for call redirection from the serving mobile service center/visitor location register to the wireless enhanced services platform;

D) transmitting a request for call forwarding information from the wireless enhanced services platform to the national home location register;

E) transmitting forwarding information from the national home location register to the wireless enhanced services platform;

F) determining whether call forwarding to voice mail is active at the wireless enhanced services platform;

G) routing the call to a voice mail server at the wireles s enhanced services platform, if call forwarding to voice mail is active;

H) determining if the call is to be forwarded to a mobile station served by the wireless enhanced services platform, if call forwarding to voice mail is not active;

I) transmitting a request for routing information for the forwarded to mobile station from the wireless enhanced services platform to the national home location register and completing the call to the forwarded to mobile station, if the call is to be forwarded to a mobile station served by the wireless enhanced services platform;

J) routing the call for completion to the forwarding number, if the call is not to be forwarded to a mobile station served by the wireless enhanced services platform; and K) completing the call to the forwarding number.

16. The method of claim 15, wherein the network switch comprises:

a long distance switch.

17. The method of claim 16, wherein the indicator of the destination mobile station comprises:

a non-geographic alias telephone number.

18. The method of claim 17, wherein the step of collecting information required to perform a feature comprises the steps of:

A) prompting the caller to select a billing option from the wireless enhanced services platform;

B) collecting the billing option selected by the caller in the wireless enhanced services platform;

C) prompting the caller to enter billing information from the wireless enhanced services platform;

D) collecting the billing information entered by the caller in the wireless enhanced services platform; and E) sending the collected billing information from the wireless enhanced services platform to the national home location register.

19. The method of claim 18, wherein the step of validating the collected information comprises the steps of:

A) validating the collected billing information in the national home location register; and B) storing the collected billing information in a billing server, if validation of the collected billing information is successful.

20. The method of claim 17, wherein the step of collecting information required to perform a feature comprises the steps of:
   A) prompting the caller to enter a passcode, from the wireless enhanced services platform;
   B) collecting the passcode entered by the caller in the wireless enhanced services platform; and
   C) sending the collected passcode from the wireless enhanced services platform to the national home location register.

21. The method of claim 20, wherein the step of validating the collected information comprises the step of:
   validating the collected passcode in the national home location register.

22. The method of claim 17, wherein the step of performing the functions necessary to implement the features in effect which do not require information collection or validation comprises the steps of:
   A) detecting that the call is a FAX call in the wireless enhanced services platform;
   B) routing the FAX call to a FAX mailbox in the wireless enhanced services platform; and
   C) storing the FAX in the FAX mailbox in the wireless enhanced services platform.

23. The method of claim 15, wherein the network switch comprises:
   a local switch.

24. The method of claim 23, wherein the indicator of the destination mobile station comprises:
   a geographic telephone number.

25. The method of claim 24, wherein the step of collecting information required to perform a feature comprises the steps of:
   A) prompting the caller to select a billing option from the wireless enhanced services platform;
   B) collecting the billing option selected by the caller in the wireless enhanced services platform;
   C) prompting the caller to enter billing information from the wireless enhanced services platform;
   D) collecting the billing information entered by the caller in the wireless enhanced services platform; and
   E) sending the collected billing information from the wireless enhanced services platform to the national home location register.

26. The method of claim 25, wherein the step of validating the collected information comprises the steps of:
   A) validating the collected billing information in the national home location register; and
   B) storing the collected billing information in a billing server, if validation of the collected billing information is successful.

27. The method of claim 24, wherein the step of collecting information required to perform a feature comprises the steps of:
   A) prompting the caller to enter a passcode, from the wireless enhanced services platform;
   B) collecting the passcode entered by the caller in the wireless enhanced services platform; and
   C) sending the collected passcode from the wireless enhanced services platform to the national home location register.

28. The method of claim 27, wherein the step of validating the collected information comprises the step of:
   validating the collected passcode in the national home location register.

29. The method of claim 24, wherein the step of performing the functions necessary to implement the features in effect which do not require information collection or validation comprises the steps of:
   A) detecting that the call is a FAX call in the wireless enhanced services platform;
   B) routing the FAX call to a FAX mailbox in the wireless enhanced services platform; and
   C) storing the FAX in the FAX mailbox in the wireless enhanced services platform.

30. The method of claim 12, wherein the network switch comprises:
   a long distance switch.

31. The method of claim 12, wherein the indicator of the destination mobile station comprises:
   a non-geographic alias telephone number.

32. The method of claim 12, wherein the step of collecting information required to perform a feature comprises the steps of:
   A) prompting the caller to select a billing option from the wireless enhanced services platform;
   B) collecting the billing option selected by the caller in the wireless enhanced services platform;
   C) prompting the caller to enter billing information from the wireless enhanced services platform;
   D) collecting the billing information entered by the caller in the wireless enhanced services platform; and
   E) sending the collected billing information from the wireless enhanced services platform to the national home location register.

33. The method of claim 12, wherein the step of validating the collected in formation comprises the steps of:
   A) validating the collected billing information in the national home location register; and
   B) storing the collected billing information in a billing server, if validation of the collected billing information is successful.

34. The method of claim 12, wherein the step of validating the collected in formation comprises the step of:
   validating the collected passcode in the national home location register.

35. The method of claim 12, wherein the step of performing the functions necessary to implement the features in effect which do not require information collection or validation comprises the steps of:
   A) detecting that the call is a FAX call in the wireless enhanced services platform;
   B) routing the FAX call to a FAX mailbox in the wireless enhanced services pl at form; and
   C) storing the FAX in the FAX mailbox in the wireless enhanced services platform.

36. The method of claim 12, wherein the network switch comprises:
   a local switch.

37. The method of claim 12, wherein the indicator of the destination mobile station comprises:
   a geographic telephone number.

38. The method of claim 12, wherein the step of collecting information required to perform a feature comprises the steps of:

A) prompting the caller to select a billing option from the wireless enhanced services platform;
B) collecting the billing option selected by the caller in the wireless enhanced services platform;
C) prompting the caller to enter billing information from the wireless enhanced services platform;
D) collecting the billing information entered by the caller in the wireless enhanced services platform; and
E) sending the collected billing information from the wireless enhanced services platform to the national home location register.

39. The method of claim 12, wherein the step of validating the collected information comprises the steps of:
A) validating the collected billing information in the national home location register; and
B) storing the collected billing information in a billing server, if validation of the collected billing information is successful.

40. The method of claim 12, wherein the step of collecting information required to perform a feature comprises the steps of:
A) prompting the caller to enter a passcode, from the wireless enhanced services platform;
B) collecting the passcode entered by the caller in the wireless enhanced services platform; and
C) sending the collected passcode from the wireless enhanced services platform to the national home location register.

41. The method of claim 12, wherein the step of validating the collected information comprises the step of:
validating the collected passcode in the national home location register.

42. The method of claim 12, wherein the step of performing the functions necessary to implement the features in effect which do not require information collection or validation comprises the steps of:
A) detecting that the call is a FAX call in the wireless enhanced services platform;
B) routing the FAX call to a FAX mailbox in the wireless enhanced services platform; and
C) storing the FAX in the FAX mailbox in the wireless enhanced services platform.

43. In a mobile radio communications network comprising at least one network switch, at least one wireless enhanced services platform, at least one national home location register, and a plurality of mobile switching center/visitor location registers, a system for completing calls to a destination mobile station, comprising:
A) means, coupled to a network switch, for receiving an indicator of a destination mobile station;
B) means, coupled to the receiving means, for obtaining an indicator of a serving mobile service center/visitor location register and an indicator of features in effect;
C) means, coupled to the obtaining means, for determining whether any features are in effect;
D) means, coupled to the features determining means, for completing the call, if there are no features in effect;
E) means, coupled to the obtaining means and the feature determining means, for performing the functions necessary to implement the features in effect which do not require information collection or validation, if there are features in effect;
F) means, coupled to the obtaining means, for determining whether any features in effect require information collection or validation;
G) means, coupled to the collection/validation determining means, for completing the call, if no features require information collection or validation;
H) means, coupled to the collection/validation determining means and the network switch, for collecting information required to perform a feature, if a feature requires information to be collected;
I) means, coupled to the collecting means, for validating the collected information;
J) means, coupled to the validating means, for determining whether to cancel the call, if validation is unsuccessful; and
K) means, coupled to the validating means, for completing the call, if validation is successful.

44. The system of claim 43, wherein the means for determining whether to cancel the call comprises:
A) means, coupled to the validating means and the network switch, for prompting the caller to select whether to reenter information or cancel the call;
B) means, coupled to the call cancellation prompting means, for repetitively collecting, transmitting and validating information and determining whether to cancel the call, if the caller selects to reenter information; and
C) means, coupled to the call cancellation prompting means, for canceling the call, if the caller selects to cancel the call.

45. The system of claim 44, wherein the call completing means comprises:
A) means, coupled to the serving mobile switching center/visitor location register, for transmitting a routing information request including the indicator of the destination mobile station to the serving mobile switching center/visitor location register;
B) means, coupled to the serving mobile switching center/visitor location register, for receiving a routing indicator for the destination mobile station from the serving mobile switching center/visitor location register; and
C) means, coupled to the routing indicator receiving means and the network switch, for routing the call to the serving mobile service center/visitor location register through the network switch.

46. The system of claim 45, further comprising:
A) means, coupled to the serving mobile switching center/visitor location register, for receiving a request for call redirection from the serving mobile service center/visitor location register;
B) means, coupled to the call redirection request receiving means, for obtaining forwarding information for the call;
C) means, coupled to the forwarding information obtaining means, for determining whether call forwarding to voice mail is active;
D) means, coupled to the means for determining whether call forwarding to voice mail is active, for routing the call to a voice mail server, if call forwarding to voice mail is active;
E) means, coupled to the means for determining whether call forwarding to voice mail is active, for determining if the call is to be forwarded to a mobile station served by the wireless enhanced services platform, if call forwarding to voice mail is not active;
F) means, coupled to the means for determining if the call is to be forwarded to a mobile station served by the wireless enhanced services platform, for obtaining routing information for the forwarded to mobile station and completing the call to the forwarded to mobile station, if the call is to be forwarded to a mobile station served by the wireless enhanced services platform; and G) means, coupled to the means for determining if the call is to be forwarded to a mobile station served by the wireless enhanced services platform, for routing the call for completion to the forwarding number, if the call is not to be forwarded to a mobile station served by the wireless enhanced services platform.

47. The system of claim 46, wherein the means for performing the functions necessary to implement the features in effect which do not require information collection or validation comprises the steps of:

A) means, coupled to the network switch, for detecting that the call is a FAX call;

B) means, coupled to the network switch, for storing the FAX; and

C) means, coupled to the network switch and the storing means, for routing the FAX call to the storing means.

48. The system of claim 47, wherein the network switch comprises:

a long distance switch.

49. The system of claim 48, wherein the indicator of the destination mobile station comprises:

a non-geographic alias telephone number.

50. The system of claim 49, wherein the means for collecting information required to perform a feature comprises:

A) a first billing prompting means, coupled to the collection/validation determining means and the network switch, for prompting the caller to select a billing option;

B) a first billing collecting means, coupled to the first prompting means and the network switch, for collecting the billing option selected by the caller;

C) a second billing prompting means, coupled to the first collecting means and the network switch, for prompting the caller to enter billing information; and D) a second billing collecting means, coupled to the second prompting means and the network switch, for collecting the billing information entered by the caller.

51. The system of claim 50, wherein the means for validating the collected information comprises:

A) means, coupled to the collecting means, for validating the collected billing information; and B) means, coupled to the validating means, for storing the collected billing information, if validation of the collected billing information is successful.

52. The system of claim 49, wherein the means for collecting information required to perform a feature comprises:

A) means, coupled to the collection/validation determining means and the network switch, for prompting the caller to enter a passcode; and B) means, coupled to the passcode prompting means and the network switch, for collecting the passcode entered by the caller.

53. The system of claim 50, wherein the means for validating the collected information comprises:

means, coupled to the collecting means, for validating the collected passcode.

54. The system of claim 47, wherein the network switch comprises:

a local switch.

55. The system of claim 54, wherein the indicator of the destination mobile station comprises:

a geographic telephone number.

56. The system of claim 55, wherein the means for collecting information required to perform a feature comprises:

A) a first billing prompting means, coupled to the collection/validation determining means and the network switch, for prompting the caller to select a billing option;

B) a first billing collecting means, coupled to the first prompting means and the network switch, for collecting the billing option selected by the caller;

C) a second billing prompting means, coupled to the first collecting means and the network switch, for prompting the caller to enter billing information; and D) a second billing collecting means, coupled to the second prompting means and the network switch, for collecting the billing information entered by the caller.

57. The system of claim 56, wherein the means for validating the collected information comprises:

A) means, coupled to the collecting means, for validating the collected billing information; and B) means, coupled to the validating means, for storing the collected billing information, if validation of the collected billing information is successful.

58. The system of claim 55, wherein the means for collecting information required to perform a feature comprises:

A) means, coupled to the collection/validation determining means and the network switch, for prompting the caller to enter a passcode; and B) means, coupled to the passcode prompting means and the network switch, for collecting the passcode entered by the caller.

59. The system of claim 56, wherein the means for validating the collected information comprises:

means, coupled to the collecting means, for validating the collected passcode.

60. The system of claim 43, wherein the network switch comprises:

a local switch.

61. The system of claim 43, wherein the indicator of the destination mobile station comprises:

a geographic telephone number.

62. The system of claim 43, wherein the means for collecting information required to perform a feature comprises:

A) a first billing prompting means, coupled to the collection/validation determining means and the network switch, for prompting the caller to select a billing option;

B) a first billing collecting means, coupled to the first prompting means and the network switch, for collecting the billing option selected by the caller;

C) a second billing prompting means, coupled to the first collecting means and the network switch, for prompting the caller to enter billing information; and D) a second billing collecting means, coupled to the second prompting means and the network switch, for collecting the billing information entered by the caller.

63. The system of claim 43, wherein the means for validating the collected information comprises:

A) means, coupled to the collecting means, for validating the collected billing information; and B) means, coupled to the validating means, for storing the collected billing information, if validation of the collected billing information is successful.

64. The system of claim 43, wherein the means for collecting information required to perform a feature comprises:

A) means, coupled to the collection/validation determining means and the network switch, for prompting the caller to enter a passcode; and B) means, coupled to the passcode prompting means and the network switch, for collecting the passcode entered by the caller.

65. The system of claim 43, wherein the means for validating the collected information comprises:

means, coupled to the collecting means, for validating the collected passcode.

66. The method of claim 1, wherein the step of collecting information required to perform a feature comprises the steps of:

A) prompting the caller to enter a passcode, from the wireless enhanced services platform;

B) collecting the passcode entered by the caller in the wireless enhanced services platform; and C) sending the collected passcode from the wireless enhanced services platform to the national home location register.

* * * * *